March 1, 1960
E. A. DAVIS ET AL
2,926,845
CALCULATING MACHINE
Filed Dec. 23, 1955
11 Sheets-Sheet 1
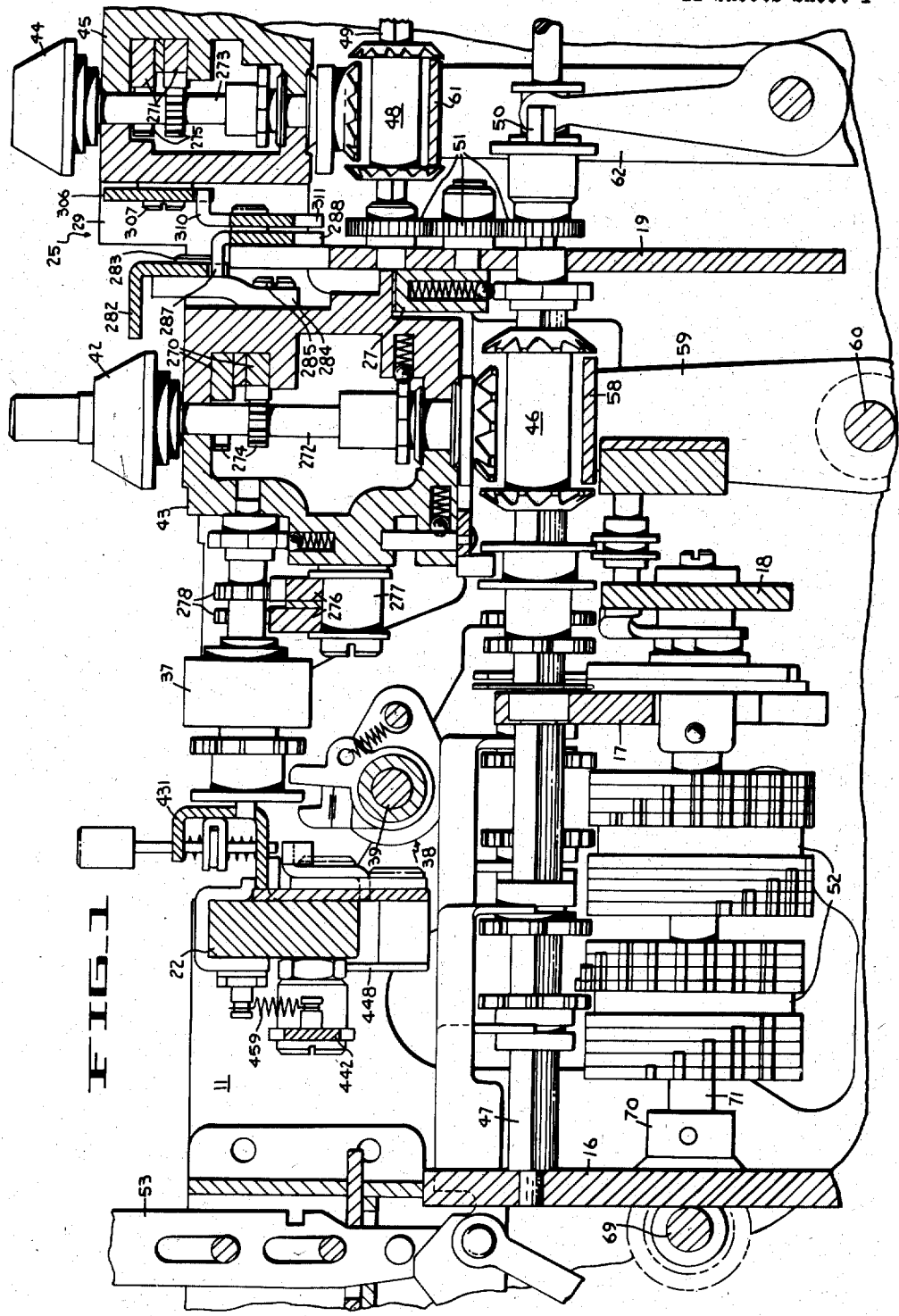

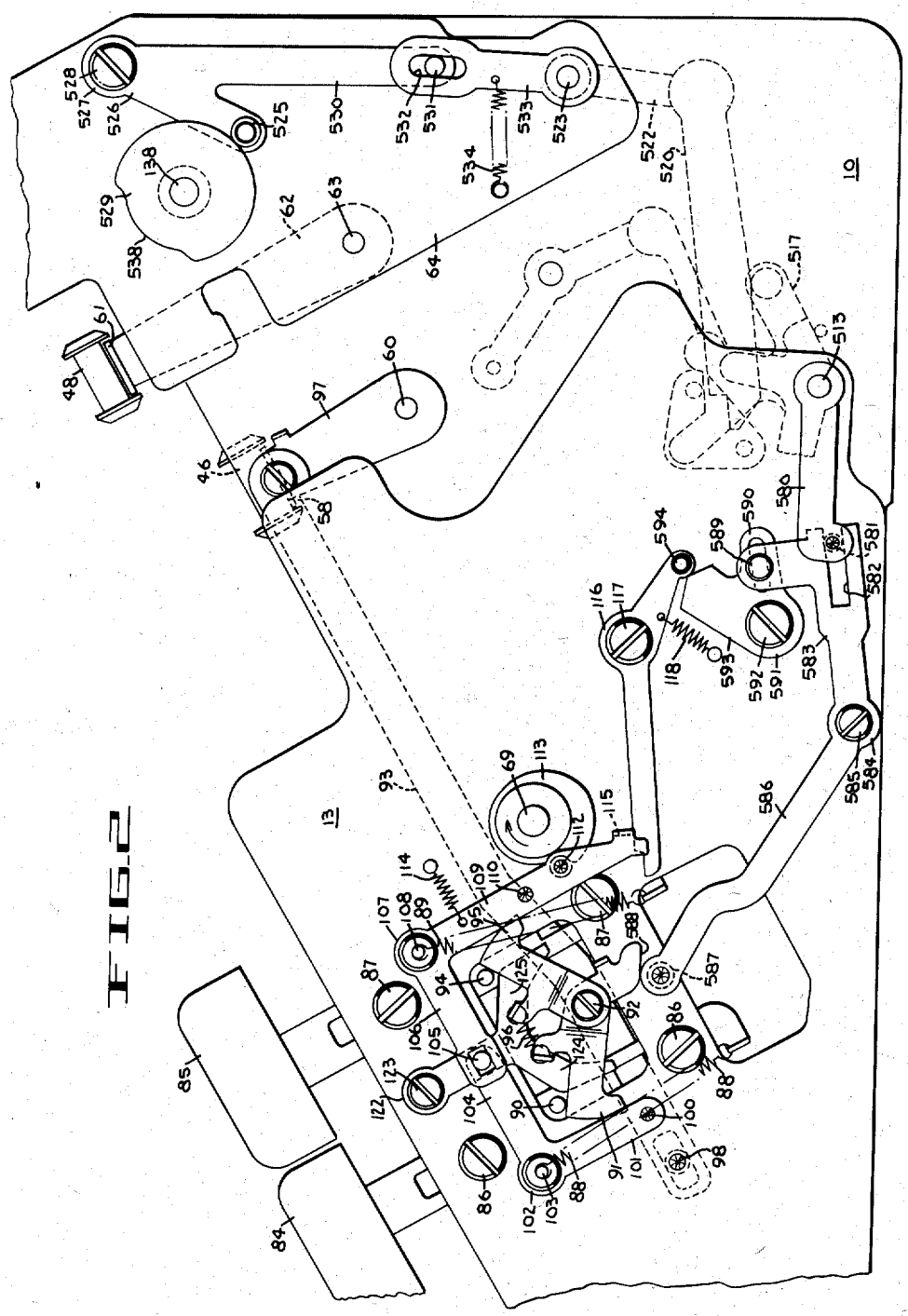

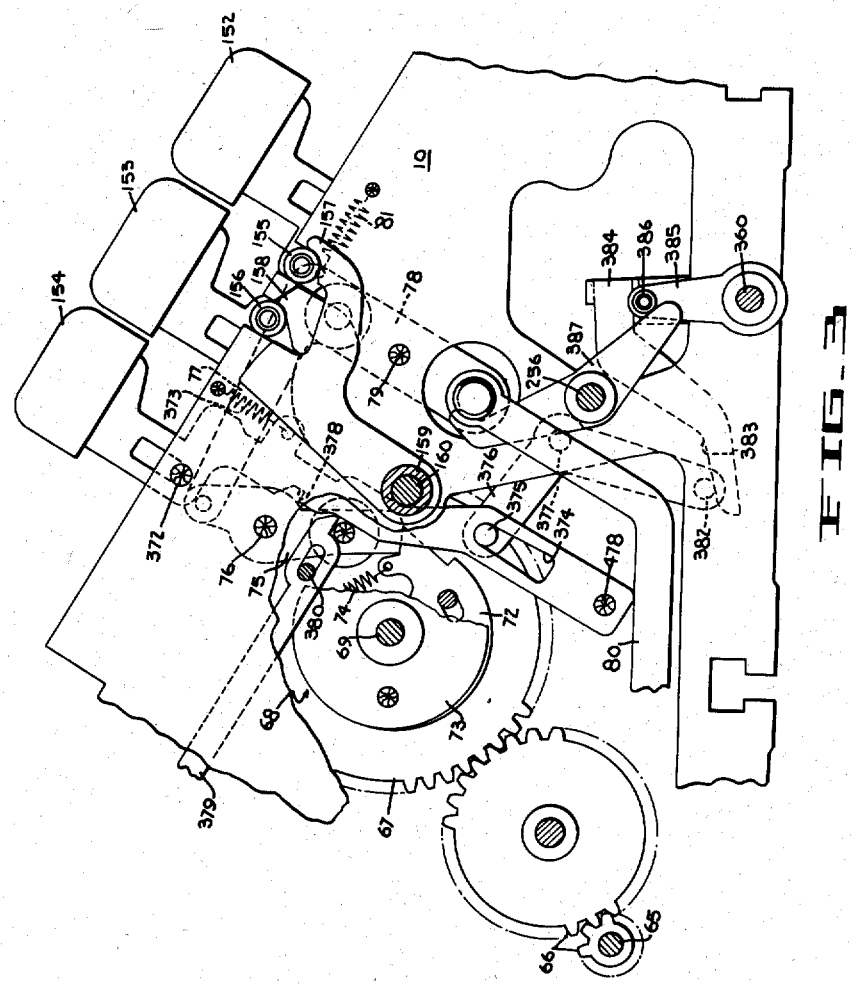

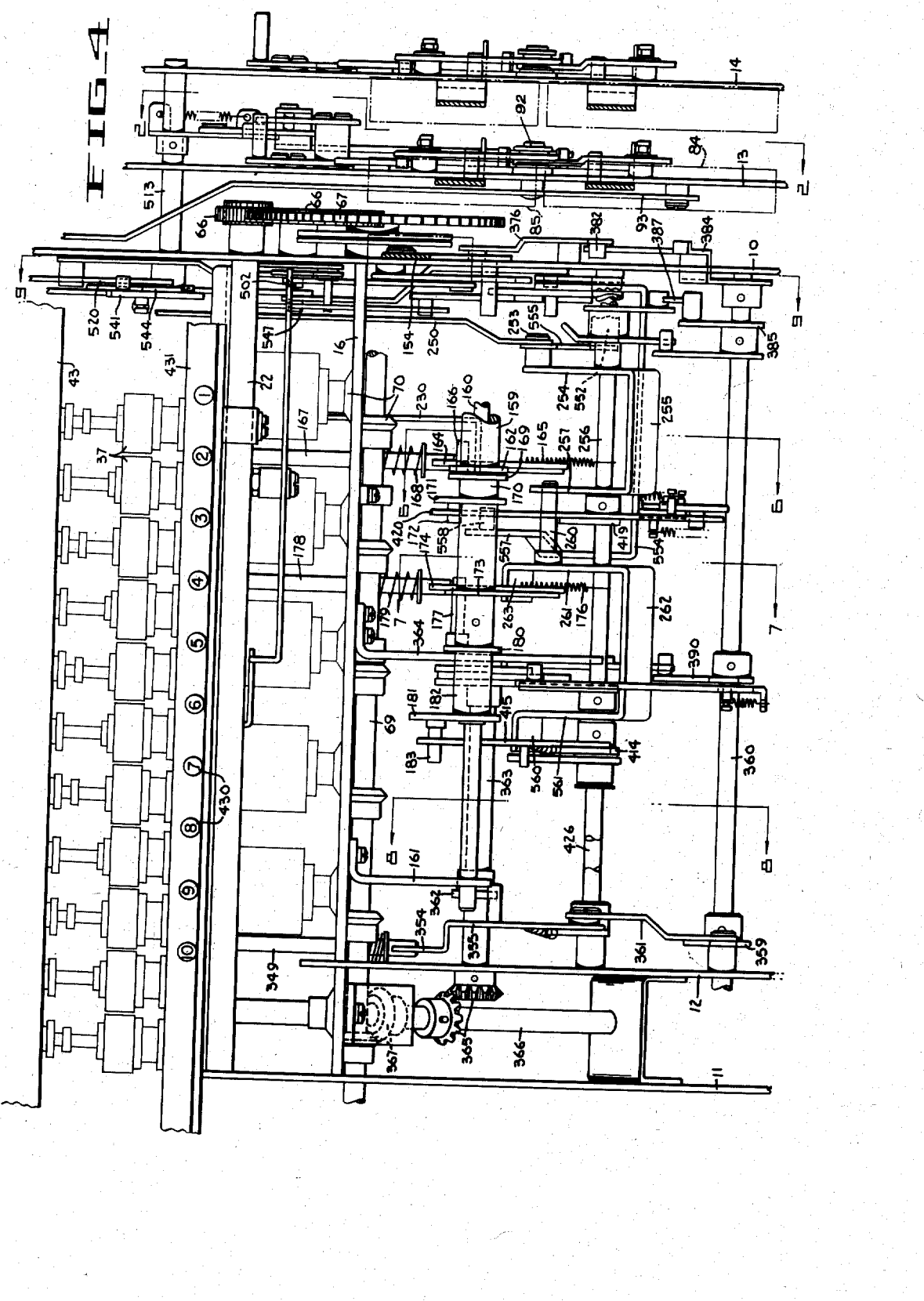

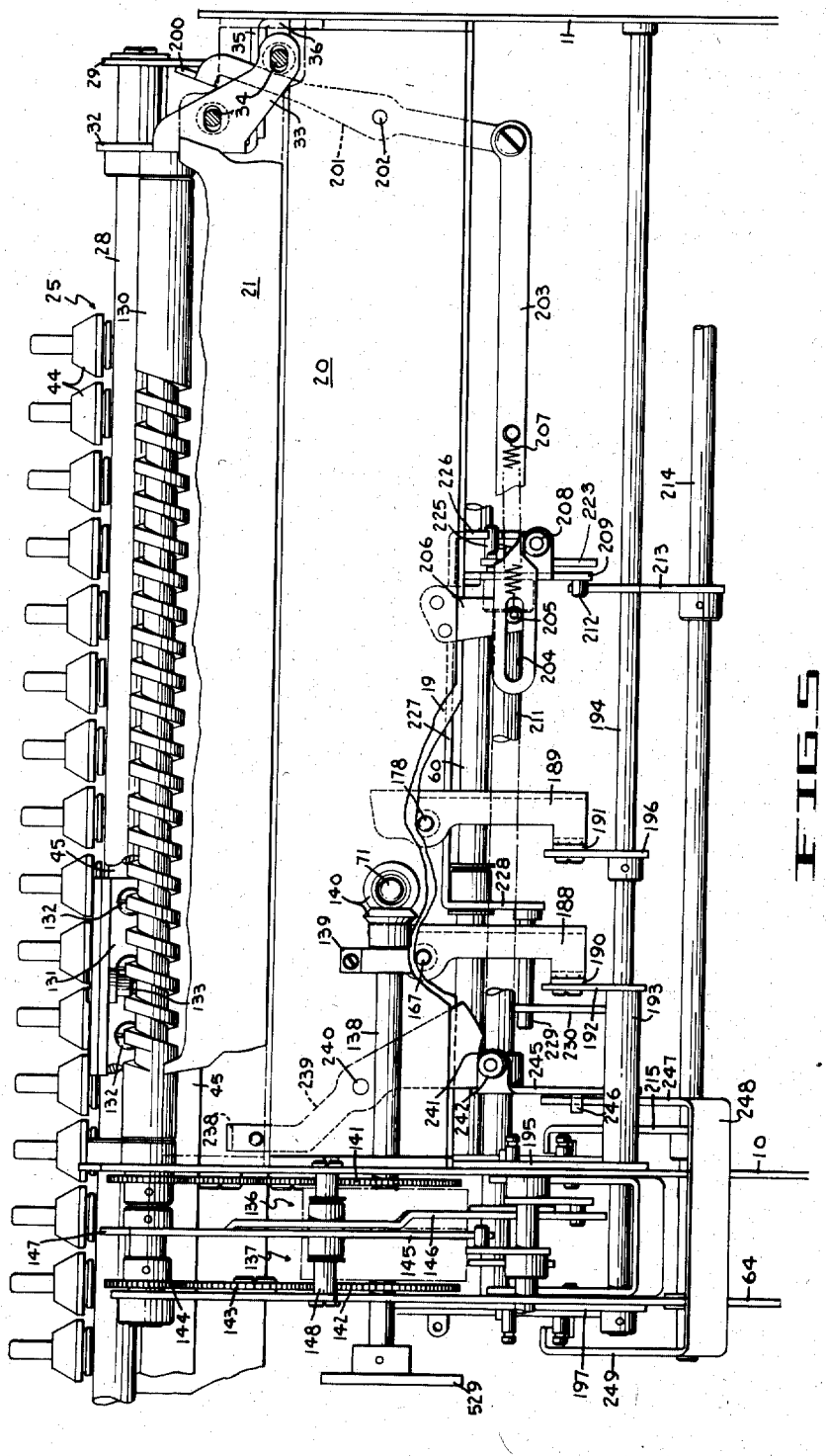

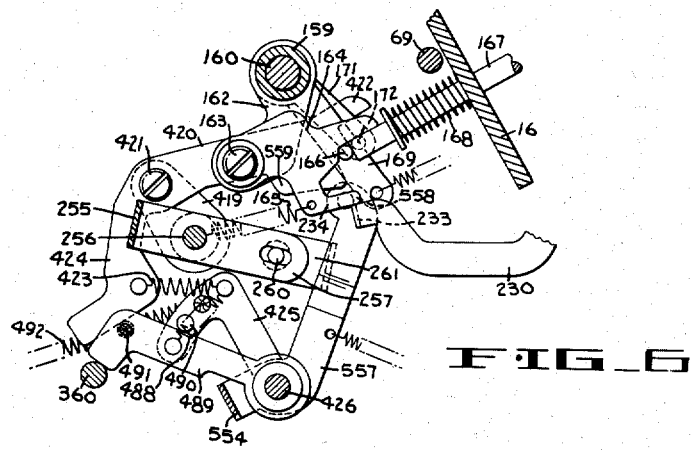
FIG_6
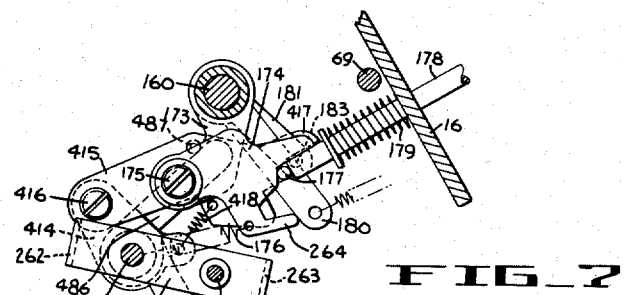
FIG_7
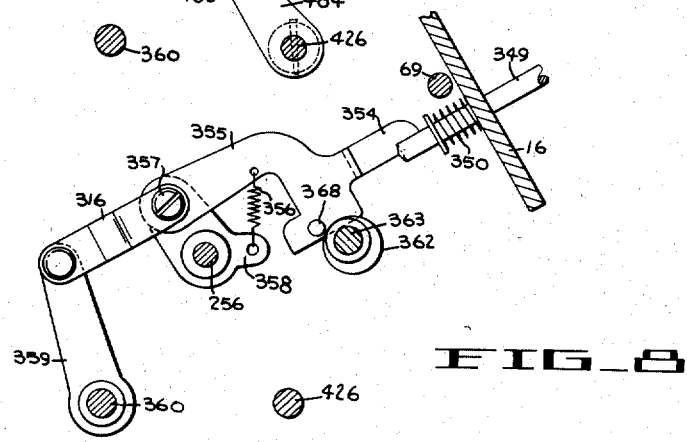
FIG_8

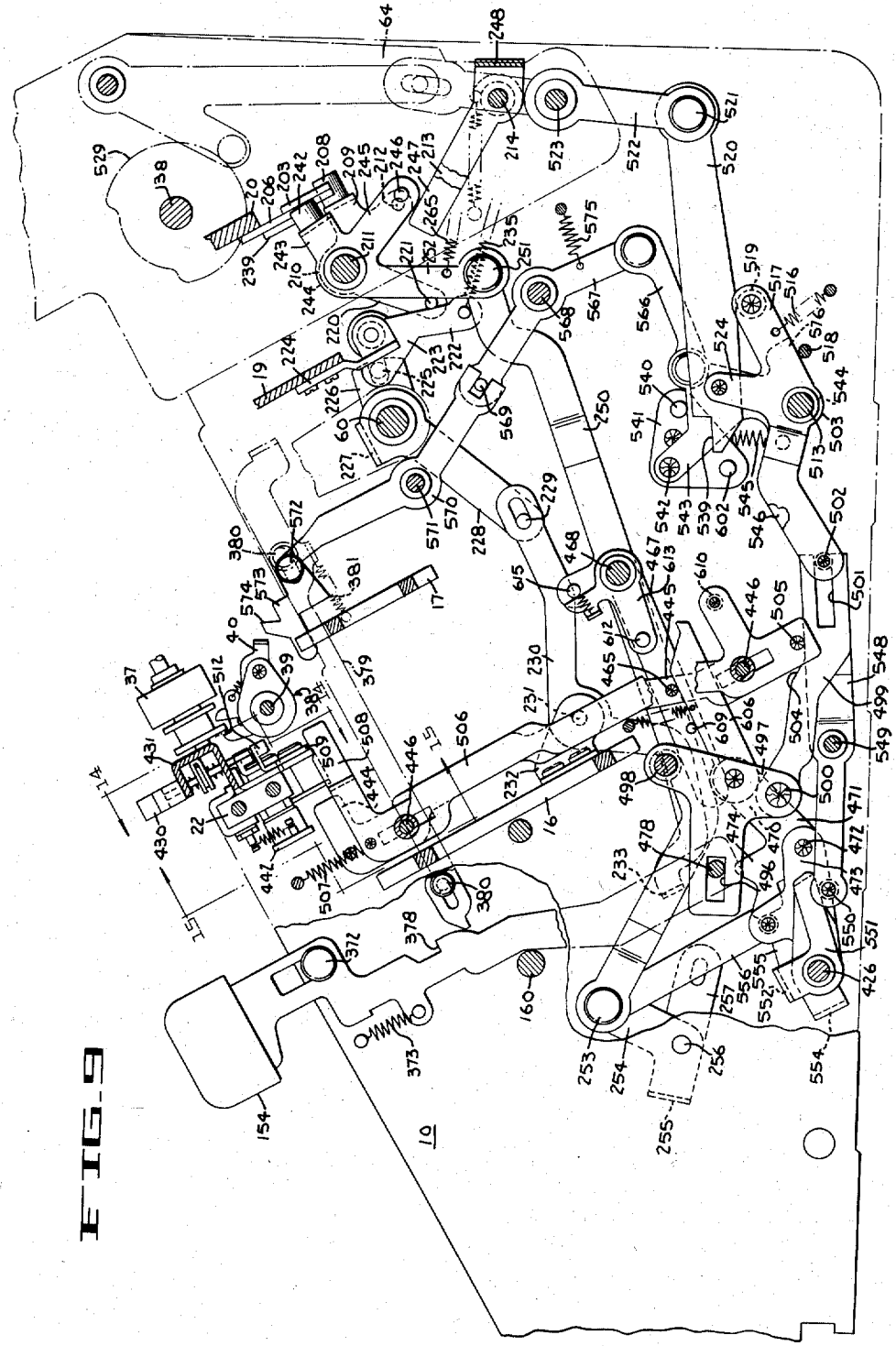

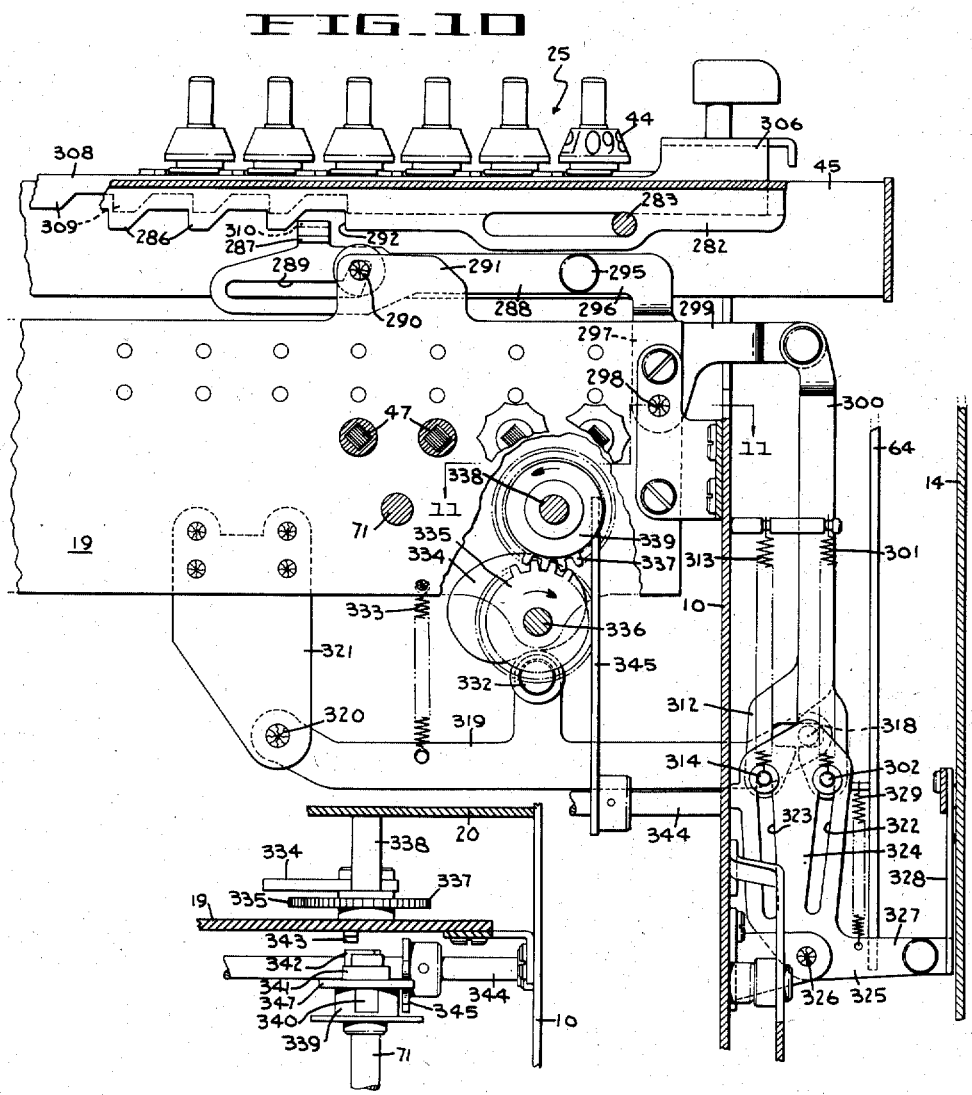

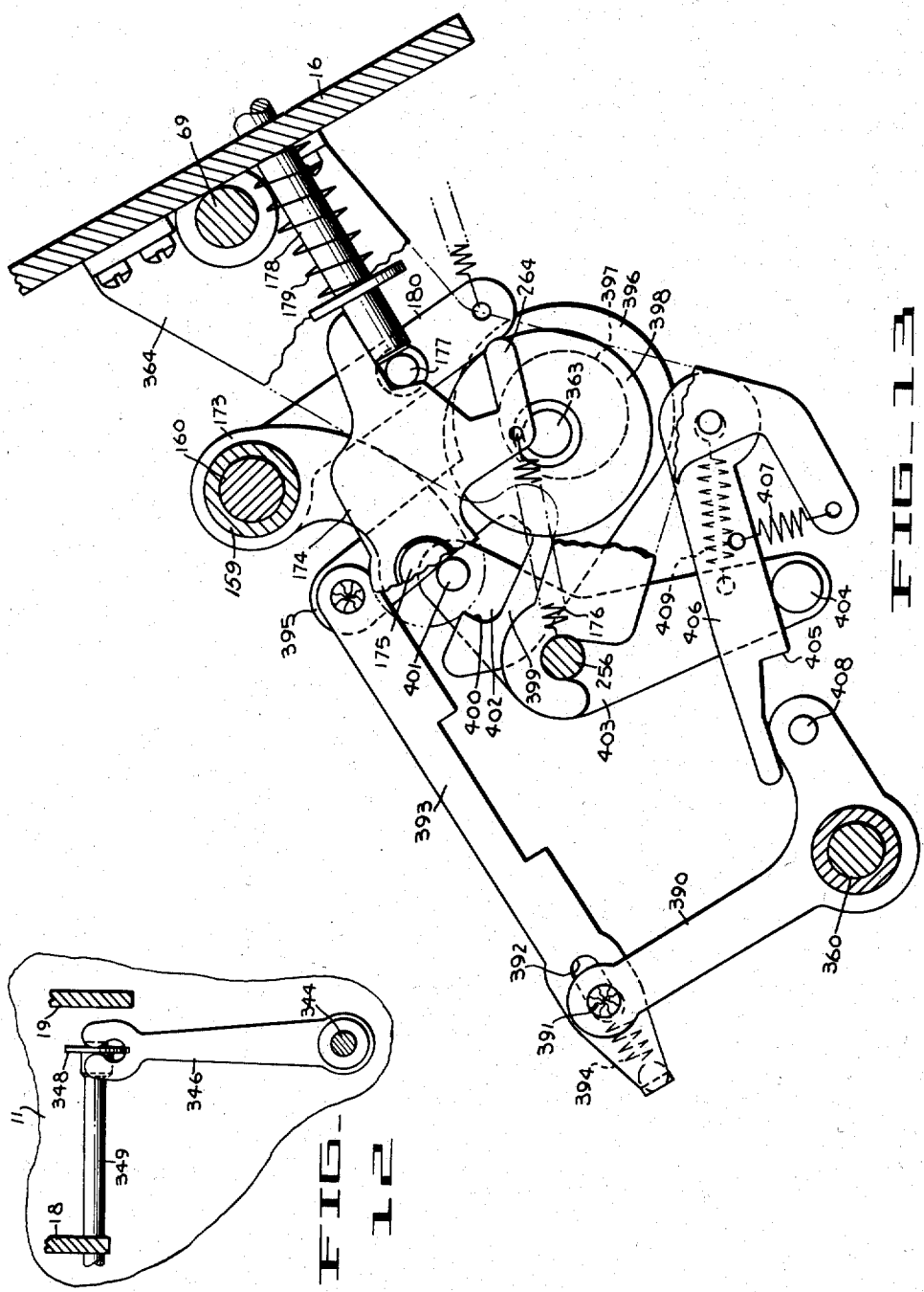

March 1, 1960  E. A. DAVIS ET AL  2,926,845
CALCULATING MACHINE
Filed Dec. 23, 1955  11 Sheets-Sheet 10
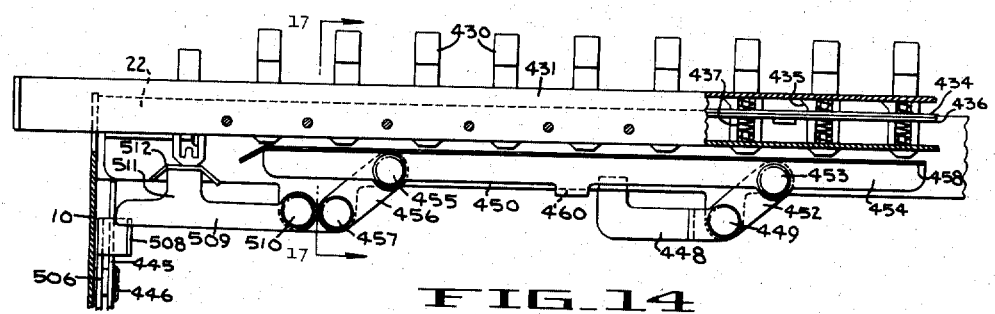
FIG_14
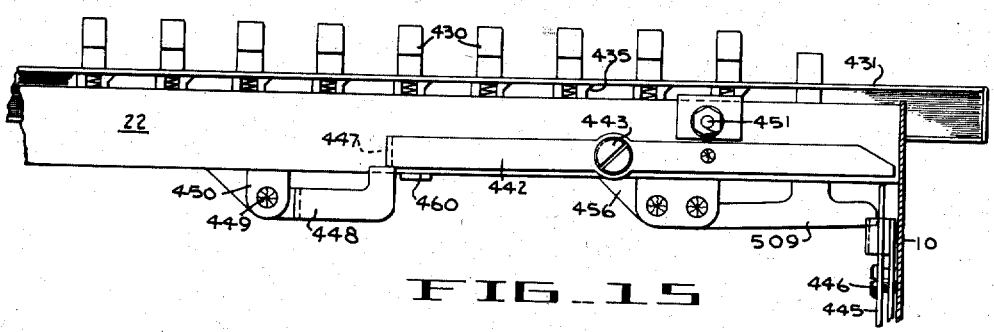
FIG_15
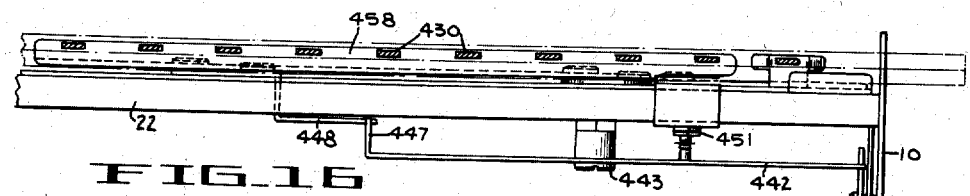
FIG_16
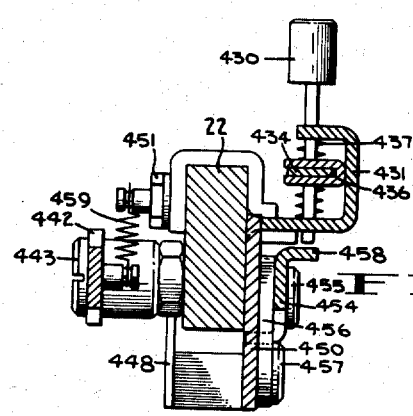
FIG_17

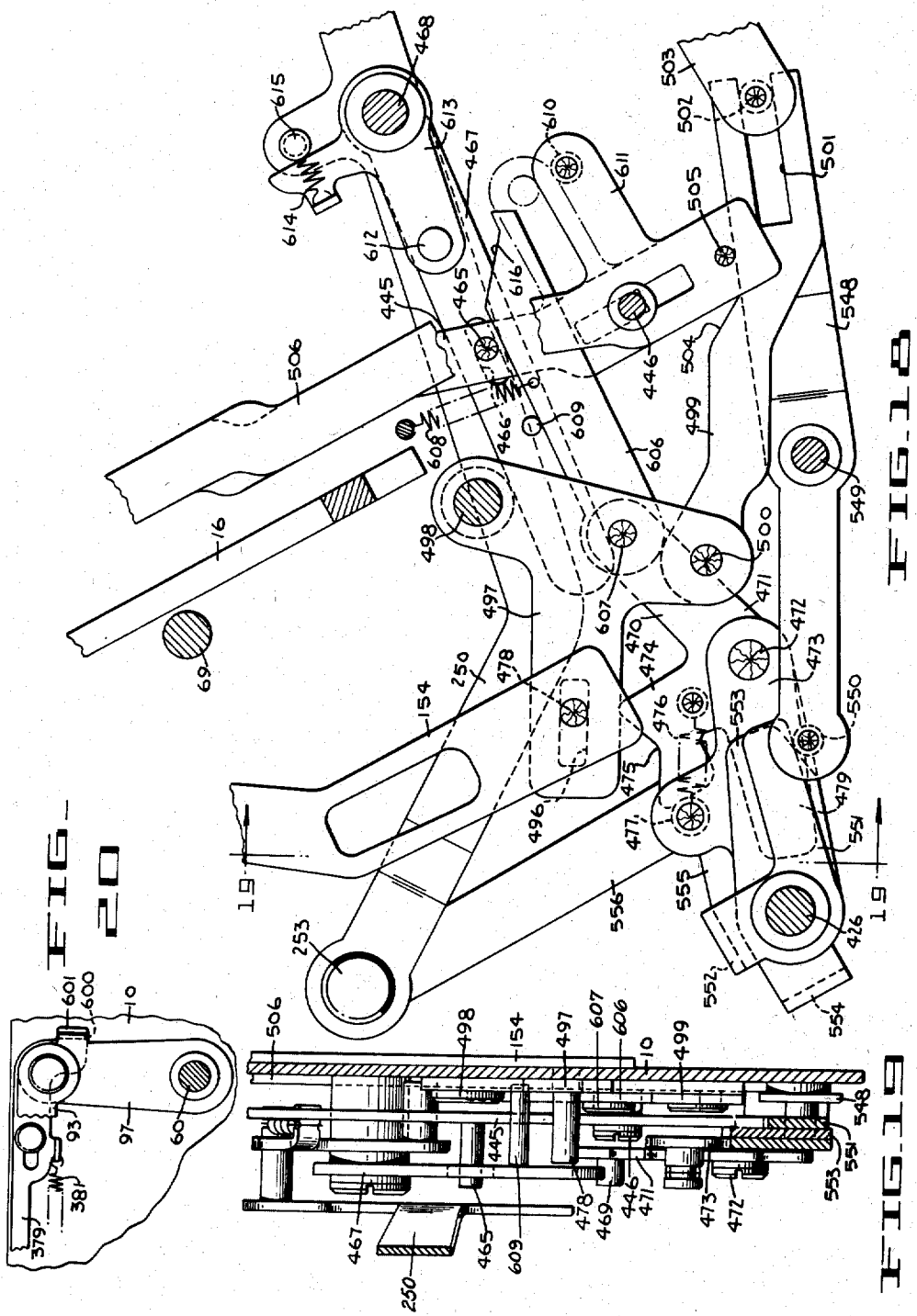

United States Patent Office 2,926,845
Patented Mar. 1, 1960

2,926,845

CALCULATING MACHINE

Elwood A. Davis, Castro Valley, and Nathaniel F. Hawthorne, Alameda, Calif., assignors to Friden, Inc., a corporation of California Application December 23, 1955, Serial No. 554,975

13 Claims. (Cl. 235—63)

This invention relates to calculating machines and is concerned more particularly with providing an improved automatic carriage shifting control means therefor.

Another object of the invention is to provide a calculating machine with an improved mechanism for conditioning the machine as a preliminary step to an automatic division operation.

Another object of the invention is to provide an improved mechanism for a calculating machine by which a value may be automatically entered in the register of the machine in any preselected ordinal position of the register.

Another object of the invention is to provide an improved mechanism for controlling the tabulation of the register of a calculating machine in either direction directly to a preselected ordinal position from any ordinal position.

Other objects and advantages will be apparent from the following description of a preferred embodiment as illustrated in the accompanying drawings in which:

Fig. 1 is a sectional elevational view taken on a plane extending longitudinally of the machine.

Fig. 2 is an elevational view of the plus-minus gate control, the view being taken on the planes indicated by the lines 2—2 of Fig. 4.

Fig. 3 is a view showing a portion of the mechanism on the inside of the right side frame of the machine, with a portion thereof broken away to show the main drive clutch.

Fig. 4 is a plan view showing the mechanism below the keyboard with the keyboard removed.

Fig. 5 is a fragmentary elevational view of the rear of the machine showing the shift control mechanism.

Fig. 6 is an elevational view showing the right shift control, the view being taken on the plane indicated by the line 6—6 of Fig. 4.

Fig. 7 is an elevational view showing the left shift control, the view being taken on the plane indicated by the line 7—7 of Fig. 4.

Fig. 8 is an elevational view of the zero resetting control, the view being taken on the plane indicated by the line 8—8 of Fig. 4.

Fig. 9 is a fragmentary elevational view taken immediately inside the right-side frame which is indicated in phantom line, the view being taken on the plane indicated by the line 9—9 of Fig. 4.

Fig. 10 is a fragmentary sectional elevational view taken transversely of the machine to illustrate a portion of the zero resetting mechanism.

Fig. 11 is a plan view of the zero resetting clutch taken on the planes indicated by the lines 11—11 of Fig. 10.

Fig. 12 is a view of a portion of the zero resetting clutch engaging control.

Fig. 13 is an enlarged elevational view of the power control mechanism for the right and left shift clutches, the view being taken on a plane coinciding with line 7—7 of Fig. 4, but showing particularly the power-operated mechanism not shown in Fig. 7.

Fig. 14 is a rear elevational view of the tabulator keys and the mechanism controlled thereby, the view being taken on the planes indicated by the lines 14—14 of Fig. 9.

Fig. 15 is a front elevational view of the tabulator key controlled mechanism shown in Fig. 14 and taken on the planes indicated by the lines 15—15 of Fig. 9.

Fig. 16 is a plan view of the tabulator key controlled mechanism shown in Figs. 14 and 15 and taken on a horizontal plane below the front carriage rail.

Fig. 17 is an enlarged sectional detail of the tabulator key control taken on a plane indicated by the line 17—17 of Fig. 14.

Fig. 18 is an enlarged fragmentary right side elevational view of the dividend tabulating control mechanism.

Fig. 19 is a front sectional view of the mechanism illustrated in Fig. 18, the view being taken on the plane indicated by the line 19—19 of Fig. 18.

Fig. 20 is a view of the release mechanism for the dividend tabulating key latch.

The invention is disclosed as embodied in a Thomas-type calculating machine in which the actuating mechanism is of the unidirectional, continuous drive, cyclically operated type, and all power-driven operations are effected by engagement and disengagement of a single clutch providing the only path of power flow from the motor of the machine to the motor driven parts thereof. Basically, a calculating machine of this construction is disclosed in the patent to Carl M. F. Friden, No. 2,229,889 issued January 28, 1941 while certain of the power-driven mechanisms referred to herein may be found to be more fully disclosed in the patents of Nils H. Bergfelt, No. 2,893,631 issued July 7, 1959, Nathaniel F. Hawthorne, No. 2,852,192 issued September 16, 1958, and Nathaniel F. Hawthorne et al., No. 2,847,160 issued August 12, 1958.

As illustrated, the machine is provided with a duplex register, but since the invention is concerned more particularly with the register carriage, only a brief description of the duplex mechanism will be given. The machine includes a base (not shown), upon which right side frame 10, left side frame 11, auxiliary frame 12, and control frames 13 and 14 are mounted (Fig. 4). The frame construction of the machine also includes transverse brackets 16, 17, 18, 19, 20, 21 and 22 (Figs. 1, 5 and 9) which extend between right and left side frames 10 and 11, respectively, and are secured thereto in any convenient manner.

The machine includes a shiftable register carriage, indicated generally at 25 (Fig. 1) which is supported for endwise sliding movement by transverse bracket 22, intermediate its width by transverse bar 27 secured on bracket 19, and at the rear by means of shaft 28 (Fig. 5) secured at its ends to each of similar carriage end frames 29. Shaft 28 is supported for sliding movement in a bushing mounted in side frame 10 and in a bushing mounted in the vertical portion 32 of a bracket 33, which is secured to transverse frame member 21 by any suitable means, such as screws 34. Formed at right angles to the vertical portion 32, horizontal portion 35 of bracket 33 is secured to bracket 36 mounted on side frame member 11 to accurately maintain coaxial alignment of the bushings and shaft 28 slidable therein.

The duplex register carriage 25 serves to mount numeral wheels 37 of the revolutions counter. Numeral wheels 37 (Figs. 1 and 9) are actuated by means of a conventional actuator, indicated generally at 38, mounted on shaft 39 which is rocked clockwise from main drive shaft 69 through a spring connection into operative engagement with the aligned numeral wheel 37 and is then translated axially to effect entry of the digit. When no count is to be made, the clockwise rocking movement may be restrained in a well-known manner by means of a neutralizing finger (not shown), the movement of which is controlled by the plus-minus gate 58. In the neutral position of gate 58 the neutralizing finger underlies arm 40 of the counter actuator and thereby blocks rocking movement thereof. Carriage 25 also mounts numeral wheels 42 of one accumulator register, which are suitably journalled in carriage frame 43, and numeral wheels 44 of the second accumulator register, which are suitably journalled in carriage frame 45. Numeral wheels 42 are adapted for actuation through suitable plus-minus gearing 46 having a sliding driving engagement with square shafts 47. Likewise, numeral wheels 44 are adapted for actuation through similar plus-minus gearing 48 having a sliding driving engagement with square shafts 49. Each square shaft 49 is driven in cyclic relation to the ordinally aligned square shaft 47 through gearing 51 and the square shaft extension 50 of shaft 47. Each shaft 47 receives differential increments of movement in a well-known manner from the associated actuating cylinders 52 under control of the usual banks of numeral keys 53 associated therewith.

The sign character of the registration in the first accumulator register is controlled by the shifting of the plus-minus gearing 46 under the control of gate, or transverse bail, 58, which is mounted at either end by similar upright arms 59 secured on transverse rockable shaft 60. The sign character of the registration in the second accumulator register may be controlled simultaneously with, or independent of, the first register by similar shifting of the plus-minus gearing 48 under the control of gate 61, mounted at its ends by similar upright arms 62 secured on transverse rockable shaft 63 (Fig. 2). Shaft 60 is suitably journalled at its ends in side frame members 10 and 11, while shaft 63 is journalled at its ends in side frame member 11 and auxiliary frame member 64 and intermediate its ends in side frame member 10. Each of the sign character control mechanisms may be controlled in any convenient manner for the performance of calculating operations.

A drive for the actuating cylinders 52 and for all other power-driven operations of the machine is derived from a motor (not shown) having its drive-shaft 65 (Fig. 3) connected by suitable gearing, including gears 66, to clutch gear 67, to which is secured a ratchet constituting the driving element of the cyclically operable clutch, indicated generally at 68. Driving gear 67 and the ratchet integral therewith is journalled on driven shaft 69, which is suitably connected by bevel gearing 70 (Figs. 1 and 4) to actuator shafts 71. The cyclic operation of the clutch 68 is controlled in a conventional manner by means of clutch pawl 72 carried by driven member 73 secured on driven shaft 69, pawl 72 normally being urged by spring 74 into clutch-engaging position with respect to the ratchet on driving gear 67.

Engagement of the clutch is controlled by means of clutch control lever 75 pivotally mounted at 76 on side frame member 10. Control lever 75 is connected by link 77 with the upper end of lever 78 pivotally mounted at 79 on side frame member 10, which lever 78 is pivotally connected at its lower end with link 80 by means of a pin extending through an aperture in side frame member 10, the link being effective to control the opening and closing of the motor switch in a conventional manner. Control lever 75 is normally urged to the clutch-disengaging position shown by spring 81.

Plus-minus mechanism

A similar pair of plus and minus keys 84, 85, respectively (Fig. 2), serve to selectively control the positioning of plus-minus gearing 46 and 48 to determine the sign character of registrations in either or both accumulator registers. Inasmuch as the present invention is concerned only with the numeral wheel dials 42 of the lower register, that mechanism controlled by the plus and minus keys 84, 85 associated therewith will be described herein. The rearward and forward shifting movement of the plus-minus spools 46 (Fig. 2) is controlled by power upon engagement of unicyclic clutch 68 (Fig. 3) in accordance with the key 84 or 85, whichever one has been depressed. Keys 84 and 85 are mounted for endwise sliding movement on control plate 13 by means of respective mounting screws 86 and 87 and are normally urged to their raised position by respective springs 88 and 89. Key 84 carries pin 90 overlying the free end of arm 91 pivotally mounted at 92 on link 93 having a pivotal connection at its rearward end with arm 97 secured on gate control shaft 60 and mounted at its forward end for endwise movement on control plate 13 by pin-and-slot connection 98. Similarly, key 85 carries pin 94 overlying the free end of arm 95, also pivoted at 92 on link 93. Arms 91 and 95 are normally urged in opposite directions about pivot 92 by spring 96 to maintain arms 91 and 95 in engagement with respective pins 90 and 94.

For an additive operation, plus key 84 (Fig. 2) is depressed and the pin 90 imparts a counter-clockwise rotation to arm 91 to a position wherein the arcual end portion of the arm is positioned in opposition to pin 100 on the lower end of vertical arm 101 of bellcrank 102 pivoted at 103 on control plate 13. The horizontal arm 104 of bellcrank 102 carries pin 105 engaging in an elongated slot in the end portion of horizontal arm 106 of bellcrank 107 pivoted at 108 on control plate 13. The depending arm 109 of bellcrank 107 carries pin 110 intermediate its length for cooperation with the arcual end portion of arm 95 when the arm 95 is rocked clockwise by pin 94 upon depression of minus key 85. When arm 91 or arm 95 is operatively positioned relative to the respective pins 100 or 110, the correlated rocking movement of the bellcranks 102 and 107 causes link 93 to be moved rearwardly or forwardly of the machine to control the adjustment of the plus-minus spools 46. Adjacent the end thereof, arm 109 carries roller 112, which cooperates with cam 113 secured on drive shaft 69 to control the clockwise and counter-clockwise rocking movement of respective bellcranks 107 and 102. Each of bellcranks 102 and 107 is normally urged by spring 114 to the inoperative position shown, which spring normally serves also to maintain roller 112 in engagement with the cam 113.

A depression of plus key 84 or minus key 85 serves through conventional means to engage clutch 68 and to close the motor switch. Such means are not considered pertinent to the instant invention and therefore are not shown. Substantially simultaneously with the depression of plus key 84 and the positioning of the arm 91 for engagement by pin 100 on bellcrank 102, the engagement of clutch 68 is effective to drive cam 113 in a clockwise direction to immediately impart a clockwise rotation to bellcrank 107 and counter-clockwise rotation to bellcrank 102, thereby moving link 93 rearwardly to shift plus-minus spools 46 to the additive sign character control position. Similarly, the depression of minus key 85 serves through pin 94 to rock arm 95 clockwise into position for engagement by pin 110 on arm 109 so that, upon engagement of the clutch and closing of the motor switch, the rotation of cam 113 immediately rocks bellcrank 107 clockwise, thereby moving link 93 forwardly of the machine to shift the plus-minus spools 46 to the left from the normally centralized position (Fig. 1) to effect a subtractive registration on numeral wheel dials 42. Upon engagement of the clutch 68, cam 113 is effective in the first 90° of the machine cycle to maintain bellcranks 102 and 107 in their rocked position until a notch in the free end of an arm of lever 116, urged clockwise by spring 118 about the pivot 117 on side frame 13, engages with ear 115 formed at right angles to the lower end of arm 109. A release of the latch lever 116 is effected by means to be hereinafter described.

Means are provided for preventing the subsequent depression of either of keys 84 or 85 upon depression of the other of the keys. For this purpose a Y-shaped member 122 is pivotally supported at 123 on control plate 13 (Fig. 2), and the arms 124, 125 thereof are positioned in a manner such that, upon depression of plus key 84, Y-shaped member 122 is cammed counter-clockwise by pin 90 to position arm 125 beneath pin 94 on key 85. Conversely, pin 94, upon depression of minus key 85, rocks Y-shaped member 122 clockwise to move arm 124 into blocking relation with pin 90 on key 84.

For a more complete description of the foregoing mechanism reference is to be had to the aforementioned patent of Nils Bergfelt, No. 2,893,631.

Carriage shift mechanism

The carriage can be shifted selectively in either direction by power-driven means under the control of manually operable keys, this mechanism being of conventional construction. Shifting of the accumulator carriage 25 to the right or to the left is controlled by the direction of rotation of worm shaft 130 (Fig. 5) suitably journalled at its one end in the vertically disposed arm 32 of bracket 33 and adjacent its other end in side frames 10 and 64. Carriage 25 carries a right-angle bracket 131 secured on carriage frame 45 by any suitable means, such as screws 132. The horizontal portion of bracket 131 carries pin 133 depending therefrom for engagement with the thread in shaft 130, the helical angle of the threads of the worm shaft being such that for each rotation of the shaft the carriage is moved to the right or left one-half of an ordinal step. Thus, to move carriage 25 one ordinal step, two complete cycles of rotation of shaft 130 are required.

Two unicyclically operable clutches are provided to control the direction of rotation of worm shaft 130 in accordance with the depression of a selected control key. Referring to Fig. 5, the right shift control clutch is indicated generally at 136, while a similar clutch for controlling a shifting operation of the carriage to the left is indicated generally at 137. The driving element of each of the clutches 136 and 137 is secured on transverse shaft 138 journalled in side frame members 10 and 64 and in bearing 139 secured on transverse frame member 20. Shaft 138 is cyclically driven through bevel gear connection 140 with an extended actuator shaft 71. To effect a right shift of the carriage 25 the driving element of clutch 136 is moved into engagement with a single tooth dog integral with 32-toothed gear 141 rotatably mounted on shaft 138, whereby cyclic rotation of gear 141 serves, through a train of 16-toothed gears, to impart counterclockwise bi-cyclic rotation to shaft 130, as viewed from the left in Fig. 5. Similarly, a left-shift of the carriage is effected by engagement of the driving element of clutch 137 with the single tooth dog integral with the 32-toothed gear 142 rotatably mounted on shaft 138. Each cyclic rotation of the 32-toothed gear 142, through the 32-toothed idler gear 143 and the 16-toothed gear 144 secured on shaft 130, serves to impart a two-cycle clockwise rotation to shaft 130. Worm shaft 130 is positively centralized in each ordinally shifted position of the accumulator carriage 25 to effect accurate alignment of the register dials 42 and 44 with the ordinal rows of keys in the keyboard of the machine. To centralize shaft 130, two diametrically opposed shoulders in the periphery of the disk 147 secured on shaft 130 are engaged by the extreme ends of arms 145 and 146 pivotally mounted on shaft 148 supported by side frames 10 and 64, which arms 145 and 146 are operated in scissor-like fashion upon engagement of either clutch 136 or 137 to release shaft 130 for bi-cyclic rotation.

Either of clutches 136 or 137 may be selectively engaged by depression of the respective shift control keys 152 or 153, or may be automatically controlled upon depression of control key 154 (Fig. 3). Shift control keys 152 and 153 are mounted for endwise sliding movement on side frame member 10 in a conventional manner and carry respective rollers 155 and 156 (Fig. 3) which are operatively related to right shift control arm 157 and left shift control arm 158, respectively. Arm 157 is secured to one end of sleeve 159 rotatably mounted on shaft 160 journalled in side frame 10 and a bracket 161 (Fig. 4) secured on transverse frame member 16. At its other end sleeve 159 carries arm 162 (Fig. 6) having a pivotal connection 163 with pusher arm 164, the notched end of which is normally urged by spring 165 into engagement with pin 166 on arm 169. Pin 166 is normally interposed between the shoulder of the notch in pusher arm 164 and the end of push rod 167, which rod is normally urged to the inoperative position shown in Fig. 6 by spring 168. Arm 169 is secured to one end of a sleeve 170 (Figs. 4 and 6), the other end of which carries a depending arm 171 having a pin 172 adjacent the lower end thereof for a purpose hereinafter described. Arms 169 and 171 are rockable as a unit on shaft 160.

Arm 158 (Fig. 3), rockable in a clockwise direction by roller 156 on left shift control key 153, is secured on shaft 160. Intermediate its ends shaft 160 carries depending arm 173 (Figs. 4 and 7) on which pusher arm 174 is pivotally connected at 175 for control by the rocking of shaft 160. Spring 176 normally urges the notched end of pusher arm 174 into engagement with a pin 177 interposed between the notch of arm 174 and the end of left shift push rod 178 and carried by an arm 180. Spring 179 normally serves to urge push rod 178 to the inoperative position shown. Arm 180 is cooperatively connected to a depending arm 181 by a sleeve 182 rockably mounted on shaft 160. A pin 183 on arm 181 serves, in cooperation with arm 180 and pin 177, to automatically control a left carriage shifting operation, as will be described hereinafter.

Referring to Figs. 3, 4, 6 and 7, the depression of right shift control key 152 rocks arm 157 and therefore arm 162 clockwise and counter-clockwise, respectively, as viewed in Figs. 3 and 6, and through pusher arm 164, moves right shift push rod 167 rearwardly to engage right shift clutch 136, while a depression of left shift key 153 rocks arm 158 and therefore shaft 160 clockwise in Fig. 3, to rock arm 173 counter-clockwise, as viewed in Fig. 7, whereupon pusher arm 174 moves left shift push rod 178 rearwardly of the machine to effect engagement of left shift clutch 137. Each of push rods 167 and 178 is mounted for endwise sliding movement in transverse frame members 16 and 18 and are provided at their rearward ends with respective depending members 188 and 189 (Fig. 5) which serve to control the engagement of shift clutches 136 and 137. Each of depending members 188 and 189 is provided with an ear formed at right angles to the lower end thereof, which serves to provide a pivotal connection for one end of respective connecting links 190 and 191. The other end of connecting link 190 is pivotally connected to the upper end of arm 192 secured to one end of sleeve 193 rockably mounted on shaft 194. At its other end sleeve 193 carries arm 195 which serves, upon the rearward movement of push rod 167, to effect engagement of right shift clutch 136. Similarly, the rearward end of link 191 has a pivotal connection with arm 196 pinned to shaft 194 which, at its left end (Fig. 5), carries arm 197 pinned thereto to control the engagement of left shift clutch 137 upon the rearward movement of push rod 178 and the rocking of shaft 194. The engagement of the clutches 136 and 137 by the rocking of arms 195 and 197 is effected in the conventional manner as disclosed in the afore-mentioned Patent No. 2,852,192.

Means are provided for control by the carriage 25, upon reaching its rightmost or leftmost end position, to effect disengagement of either the right shift clutch 136 or the left shift clutch 137 in the full-cycle position thereof even though shift key 152 or 153 is held depressed. Referring to Figs. 5, 6, 7 and 9, upwardly extending ear 200, formed at right angles to the upper end of lever 201 pivoted at 202 on transverse frame member 20, is adapted for engagement by the left-hand carriage end frame 29 (as viewed from the front of the machine) when the carriage is moved to the penultimate ordinal right end position. At its lower end, lever 201 is pivotally connected to the left end of link 203 (right end in Fig. 5) which is provided at its right end with elongated slot 204 engaged by pin 205 on depending bracket 206 secured to transverse frame member 20. Lever 201 is normally urged (in a clockwise direction in Fig. 5) by spring 207 to maintain the right end of slot 204 adjacent pin 205. The slotted end of the link 203 is distended to provide a cam surface operably related to roller 208 on an ear formed at a right angle to one arm 209 of bellcrank 210 (Figs. 5 and 9) mounted for rocking movement on shaft 211 supported in side frame members 10, 11 and 64. Arm 209 of bellcrank 210 also carries pin 212 normally maintained out of engagement with the free end of arm 213 secured on shaft 214 journalled in side frame members 10, 11 and 64. Shaft 214 also carries arm 215 pinned thereto which, upon rocking of shaft 214, controls disengagement of the right shift clutch 136 in the full-cycle position thereof. Upon engagement of clutch 136 by the rocking of arm 195, arm 215 and therefore shaft 214 is rocked clockwise (Fig. 9) to rock arm 213 into abutting relation with pin 212. A second arm 220 of bellcrank 210 carries pin 221 in engagement with arm 222 of bellcrank 223 pivotally mounted on depending bracket 224 secured on the transverse frame member 19 of the machine. Pin 225 on bellcrank 223 is engaged in the bifurcation in the end of one arm 226 of bail 227 (Figs. 5 and 9) mounted for rocking movement on shaft 60. The other arm 228 of the bail 227 extends forwardly of the machine and carries pin 229 engaging in an elongated slot in the rearward end of lever 230 pivoted at 231 on bracket 232 secured on transverse frame member 16. The forward end of the lever 230 is provided with an ear 233 (Figs. 6 and 9) formed at right angles thereto and positioned to underlie the rearwardly extending finger 234 of pusher arm 164.

As seen in Fig. 5, as the carriage 25 is shifted one ordinal position to the left from the position shown (to the right if viewed from the front of the machine), lever 201 is rocked counter-clockwise to move link 203 to the right, whereupon the cam surface on link 203 becomes effective to rock bellcrank 210 (clockwise in Fig. 9) against the urgency of spring 235. Rocking of the bellcrank 210, through pin 212, imparts a counter-clockwise rotation to arm 213, shaft 214, and arm 215 to disengage right shift clutch 136 in the full-cycle position thereof. Simultaneously with the counter-clockwise rocking movement of shaft 214, pin 221 on bellcrank 210 serves to impart a clockwise rotation to bellcrank 223 which, through pin 225, rocks bail 227 and lever 230 to remove pusher arm 164 (Fig. 6) from its operative position with respect to push rod 167, thereby enabling spring 168 to restore pusher rod 167 to the inoperative position shown.

The movement of the carriage 25 to its leftmost end position (as viewed from the front of the machine) operates in a similar manner to automatically disengage the left shift clutch 137, thereby terminating the shifting operation in the full-cycle position of the clutch. As the carriage 25 is moved to the left to the penultimate ordinal position thereof, a bracket (not shown), secured to the lower surface of carriage frame 45, engages ear 238 formed at right angles to the upper end of lever 239 (Figs. 5 and 9) pivoted at 240 on transverse frame member 20. The lower distended end of lever 239 is provided with a camming surface 241 for cooperation with roller 242 mounted on the laterally extended end of one arm 243 of a three-arm lever 244 pivotally mounted on shaft 211. The second arm 245 of three-arm lever 244 carries pin 246 normally maintained out of engagement with one arm 247 of bail 248 rockably mounted on shaft 214, the other arm 249 of bail 248 being effective, upon counter-clockwise rotation of bail 248 (as viewed from the right as in Fig. 9), to effect a disengagement of the left shift clutch 137 in the full-cycle position thereof. Similarly, as in the occurrence of the engagement of the clutch 136, as arm 197 (Fig. 5) is rocked to effect engagement of the left shift clutch 137, bail 248 is rocked clockwise (Fig. 9) sufficiently to engage arm 247 with pin 246.

As the carriage is moved into its leftmost position, lever 239 is rocked (clockwise in Fig. 5) to impart a clockwise rotation to lever 244 (Fig. 9) which is immediately effective, through pin 246, to rock bail 248 counter-clockwise, thereby effecting a disengagement of the clutch 137. Means are provided to disable the left shift control mechanism simultaneously with the disengagement of the left shift clutch 137. For this purpose link 250 (Figs. 4 and 9) is pivoted at its rearward end at 251 on the lower end of the arm 252 of three-arm lever 244, and at its forward end is pivoted at 253 on one arm 254 of a bail 255 rockably mounted on transverse shaft 256 journalled at its ends in side frame members 10 and 12. The other arm 257 of bail 255 is provided with an elongated slot engaged by pin 260 on one arm 261 of bail 262 rockably mounted on shaft 256 (Figs. 4, 6 and 7). Arm 261 of bail 262 is provided with laterally extended ear 263 underlying the depending rearwardly extended finger 264 of pusher arm 174. Thus, it can be seen that as lever 244 is rocked clockwise (Fig. 9) against the urgency of spring 265, link 250 is moved forwardly of the machine and rocks bails 255 and 262 counter-clockwise to lift pusher arm 174 out of operative relation with push rod 178, thereby releasing rod 178 to the urgency of its spring 179.

The foregoing description is believed to be sufficient for an understanding of the right and left shift control mechanisms. However, for a more complete disclosure thereof, reference is to be had to the patent of Nathaniel F. Hawthorne, No. 2,852,192.

*Zero resetting mechanism*

Means are provided for resetting any displaced accumulator numeral wheels 42 or 44 and/or revolutions counter numeral wheels 37 to "0" position and for arresting such wheels positively in the "0" position. The accumulator restoring means includes similar rack bars 270 and 271 (Fig. 1) mounted for endwise sliding movement in respective frames 43 and 45 adjacent the upper ends of respective numeral wheel shafts 272 and 273. The upper and lower rack of each pair of racks 270, 271 cooperate in a well-known manner with respective mutilated gears 274, 275 to restore any of respective numeral wheels 42 or 44 to their "0" position, when displaced therefrom. To effect a zero resetting of either of the series of numeral wheels 42 or 44, respective rack bars 270, 271 are selectively moved to the right, as viewed from the front of the machine, by manually operated means (not shown) or by selectively operated power means. Since the present invention is concerned more particularly with the power operation of rack bars 270, only that part of the zero resetting mechanism associated therewith will be described herein. A brief description, however, will be given of that part of the zero resetting mechanism associated with numeral wheels 44 insofar as the selective control for either of the registers is concerned.

The revolutions counter wheels 37 may be simultaneously restored to "0" registration with the zero resetting of the register dials 42. For this purpose, rack bars 276, similar to rack bars 270, are mounted for reciprocatory movement on a plurality of rollers 277 mounted on carriage frame 43 for cooperation with alternately offset mutilated gears 278 to effect a zero resetting of the dials 37. For a complete description of the accumulator and revolutions counter resetting mechanism reference is to be had to the patent of Hawthorne et al., No. 2,847,160.

The resetting operation of the numeral wheels in either register is effected in any shifted position of the carriage by similar zero resetting drive members which are normally inoperative with respect to the resetting mechanism in the carriage. Actuating slide 282 (Figs. 1 and 10) is angular in form and is mounted for reciprocatory movement by the engagement of each of similar slots adjacent the ends thereof with a pin 283 on similar supports 284 secured on carriage frame member 43 by any suitable means, such as screws 285. At its right end, as viewed from the front of the machine, the horizontal flange of the angularly formed actuating slide 282 is extended to provide an operative control for rack bars 270 and 276 upon movement of the slide to the right. Actuator slide 282 is normally urged to the left (Fig. 10) by a spring means (not shown) whereby, in each ordinal position of the register carriage, a tooth of the plurality of ordinally spaced teeth 286 provided in the vertical flange of angularly formed actuator slide 282 is positioned for engagement by ear 287 formed at right angles to slide 288 mounted for endwise reciprocating movement by means of slot 289 in engagement with pin 290 on upwardly extended portion 291 of transverse frame member 19. It will be noted that ear 287, in its inactive position shown in Fig. 10, is below teeth 286 to provide for unimpeded shifting of the carriage. The normally inactive position of ear 287 is determined by the position of pin 290 in the agnularly upwardly extended right-hand end of slot 289. As viewed in Fig. 10, with the carriage in its leftmost position, it can be seen that immediately upon reciprocation of the slide 288, pin 290 will serve to cam ear 287 upwardly into engagement with shoulder 292 on actuator slide 282 to move the slide to the right.

To effect a reciprocating movement of ear 287, slide 288 is pivotally connected at 295 (Fig. 10) to the horizontally extended end of one arm 296 of bellcrank 297 mounted for rocking movement on pin 298 on transverse frame member 19. The other arm 299 of bellcrank 297 extends laterally beyond right side frame 10 and pivotally supports the upper end of link 300 which is normally urged upwardly by spring 301 secured at its one end on a pin on side frame member 10 and at its other end on pin 302 on the lower end of link 300. Spring 301 serves, therefore, to urge slide 288 to the inactive position shown in Fig. 10.

The zero resetting mechanism for controlling the zero resetting operation of numeral wheel dials 44 is similar to that mechanism associated with register dials 42. Actuator slide 306 (Figs. 1 and 10) is mounted at each end for reciprocating movement on carriage frame member 45 by any suitable means, such as screws 307, and is provided with rack 308 having a plurality of ordinally spaced teeth 309 similar to teeth 286 on slide 282, one tooth for each ordinal position of the carriage 25. Teeth 309 are positioned for engagement by lateral actuating extension 310 on slide 311 (Fig. 1) structurally similar to slide 288 and mounted for endwise movement adjacent to, and parallel with, slide 288 on pin 290. Lateral extension 310 is normally positioned below teeth 309 to enable uninterrupted shifting movement of the carriage 25. Pin 290 serves, upon reciprocation of slide 311 in cooperation with a slot similar to the slot 289 in slide 288, to cam extension 310 into active position for engagement with a corresponding tooth 309. To control the reciprocation of slide 311, a bellcrank having the same configuration as that of bellcrank 297 is rockably mount-
ed on pin 298 in a plane adjacent to and parallel with bellcrank 297, with the outwardly extended arm of the bellcrank pivotally supporting the upper end of link 312. Spring 313 tensioned between pin 314 on the lower end of link 312 and a stud on side frame member 10, serves to normally maintain slide 311 and the lateral extension 310 in the inactive position shown in Fig. 10.

The operation of the actuator slides 282 or 306 is selectively controlled by the downward movement of one or the other of the respective links 300 or 312. The reciprocatory movement of the link 300 or 312 is controlled by power-operated means in a conventional manner. A notch is provided in link 300 adjacent the lower end thereof and is normally engaged by roller 318 on the free end of cam follower arm 319 pivoted at 320 on depending bracket 321 secured to transverse frame member 19 (Fig. 10). Similarly, the lower offset end of the link 312 is provided with a notch opposed to, and aligned with, the notch in link 300 for selective engagement with roller 318 on arm 319. Each of pins 302 and 314 on respective links 300 and 312 are normally spring-urged to the upper end of respective vertical slots 322, 323 in the expanded arm 324 of bellcrank 325 pivoted at 326 on a bracket secured on side frame member 10. The other arm 327 of bellcrank 325 is pivotally connected to the manually operated member 328 and also carries one end of spring 329, the other end of which is secured to a stud in auxiliary frame member 64. Spring 329 serves to normally maintain the notch in link 300 in engagement with roller 318 on arm 319. However, if a zero resetting operation of numeral wheel dials 44 is desired, links 300 and 312 are rocked counter-clockwise (Fig. 10) upon manually controlled rocking of bellcrank 325 to effect a disengagement and engagement of the respective notches with roller 318. With roller 318 normally engaged in the notch of link 300 or selectively engaged by the notch in link 312, clockwise rocking of arm 319 becomes effective to restore respective numeral wheels 42 or 44 to "0" registration as disclosed in Patent No. 2,847,160. Revolutions counter wheels 37 (Fig. 1) will, when desired, be reset to "0" simultaneously with the zero re-resetting of the numeral wheel dials 42.

To control the clockwise rocking movement of the arm 319, a projection intermediate the ends thereof carries roller 332 urged by spring 333 to follow cam 334 integrally mounted with gear 335 rotatable on stud 336 on transverse frame member 19. Gear 335 is enmeshed with gear 337, the hub of which is secured on the forward end of shaft 338 (Fig. 11) and serves as a journal for gear 337 in transverse frame member 19. At its rearward end shaft 338 is journalled in transverse frame member 20 supported in the frame-work of the machine. With each rotation of gears 337 and 335, cam 334 effects an oscillatory movement of arm 319 which, with the roller 318 normally positioned as shown in Fig. 10, moves link 300 downwardly to translate slide 288 and ear 287 to the right, causing actuation of zero resetting slide 282.

Selectively operable drive means are provided to control the cyclic rotation of cam 334 and for this purpose the lowest order actuating shaft 71 (Fig. 11) is extended rearwardly and carries collar 339 secured adjacent the end thereof. Collar 339 is provided with diametrically opposed slots engageable by corresponding teeth 340 on the forward end of a shiftable drive establishing collar 341 slidably mounted on the end of shaft 71. On the opposite end thereof collar 341 is provided with arcual tooth 342 adapted for engagement with the corresponding tooth 343 on the hub of gear 337. To control the engagement of tooth 342 with tooth 343 on the hub of gear 337, shaft 344 journalled at its ends in side frame members 10 and 11 (Figs. 10, 11 and 12), carries similar upright arms 345 and 346. The free end of arm 345 is slotted to engage annular flange 347 of collar 341 so that upon rocking of shaft 344, arm 345 is operative to control the sliding movement of collar 341 on shaft 71. Oscillation of the arm 345 is controlled by the movement of the push rod 349 and disk 348 secured thereon and engaged in the bifurcated free end of arm 346 secured on shaft 344 adjacent left side frame member 11. Push rod 349 is mounted for endwise movement in transverse frame members 16 and 18 and is normally urged forwardly of the machine or to the left (Fig. 8) by spring 350.

Referring to Figs. 4 and 8 the notched offset end 354 of pusher arm 355 is normally urged by spring 356 into engagement with the forward end of push rod 349 to control the rearward movement thereof and the cooperative engagement of the tooth 342 with the tooth 343. At its other end, pusher arm 355 is pivotally mounted on pin 357 of arm 358 mounted for rocking movement on transverse shaft 256. Arm 359 (Fig. 8) is secured on shaft 360 and carries one end of link 316, the other end of which is pivotally mounted on pin 357 of arm 358. Thus, upon clockwise rocking movement of shaft 360, pusher link 355 moves push rod 349 rearwardly to effect engagement of the resetting clutch.

The operation of the zero resetting mechanism associated with either of numeral wheel dials 42 or 44 may be rendered operable by the depression of a selected one of two control keys (not shown), either of which is effective to impart a clockwise rocking movement to shaft 360 (Fig. 8) and to engage the clutch and close the motor switch in a conventional manner, as fully described in the aforementioned Patent No. 2,847,160. Shaft 360 may also be rocked clockwise, as viewed in Fig. 8, by the depression of the dividend tabulating key 154 (Figs. 3 and 4), as will be hereinafter described.

In 180° of the zero resetting cycle, pusher arm 355 (Figs. 4 and 8) is disengaged from push rod 349 thereby enabling spring 350 to restore rod 349 to its inactive position. For this purpose cam 362 is secured on shaft 363 journalled at its one end in a bracket 364 secured on transverse frame member 16, and at its other end shaft 363 is journalled in left side frame 12 and is cyclically driven by bevel gearing 365 from angularly disposed shaft 366 having a bevel gear connection 367 with main drive shaft 69. Cam 362 is operatively related to pin 368 on a depending portion of pusher arm 355, such that upon movement of arm 355 to the right and following 180° of the first machine cycle, cam 362 engages pin 368 to raise the notched end of pusher arm 355 out of engagement with the forward end of push rod 349 and maintains pusher arm 355 in the disengaged position for a substantial portion of the remainder of the cycle. However, teeth 342 and 343 of the resetting clutch are frictionally maintained in engagement until near the end of the cycle due to the load imposed thereon. The structural shape of the cam (Fig. 10) is such that immediately prior to the end of the cycle, arm 319 and therefore roller 332 become effective, under the urgency of the relatively strong spring 333, to rotate cam 334 and therefore tooth 343 ahead of the driving tooth 342, thereby releasing the frictional bond therebetween so that collar 341 is immediately restored to its normally inactive position under the influence of spring 350 on pusher rod 349 substantially simultaneously with the return of the pusher arm 355 under control of cam 362.

Tabulation and dividend entry

The tabulating and dividend entry mechanism of the instant invention operates to zeroize revolutions counter dials 37 and register numeral wheels 42 as a preliminary to a division operation, to effect a shifting movement of the accumulator carriage in either direction to a selected ordinal position, and to effect entry of the dividend into the accumulator in the selected ordinal position thereof while suppressing the usual count made in the revolutions counter during entry of the value into the accumulator. After setting the dividend into the keyboard, the only other operation necessary is the depression of the dividend control key after which the machine automatically operates to perform the above-described functions. The desired ordinal position of the carriage in which the dividend entry is to be effected is preset in accordance with the number of quotient figures desired or to indicate the position of the decimal point in the quotient.

In the embodiment of the invention selected for illustration, the first operation which occurs on depression of the dividend key 154 (Figs. 3 and 9) is an operation of the zero resetting means immediately followed by a shifting of the carriage in one direction or the other as determined by the dividend tabulating button which has been preset, if the carriage is displaced from the desired tabulated position.

Referring to Figs. 3 and 9 dividend key 154 is mounted for endwise sliding movement on the side frame 10 by means of pin 372 engaging a slot therein. Spring 373 urges key 154 to the raised position shown in Fig. 3. An elongated slot 374 is provided in key 154 adjacent the lower end thereof to receive a pin 375 carried at the end of one arm of a bellcrank 376 pivotally mounted at 377 on side frame 10.

Intermediate its ends key 154 (Figs. 3 and 9) is provided with a latching notch 378 for engagement by the latching end of a latch slide 379 mounted for endwise sliding movement on the side frame member 10 (shown partially in phantom line in Fig. 9) by similar pin-and-slot connections 380 and normally urged forwardly to its latching position by a spring 381. Thus, upon depression of key 154, slide 379 becomes effective to latch the key in depressed position and it remains latched until near the end of the operation when it is released by means to be described later.

Depression of key 154 serves to enable operation of the zero resetting mechanism for the revolutions counter dials 37 and the register dials 42, to condition power means for the control of the right or left shift mechanism, to block the counter actuator, and to effect engagement of the main drive clutch 68 and the closing of the motor switch.

The zero resetting mechanism and the drive means are enabled, upon depression of key 154 (Fig. 3), when the key operates to impact a counter-clockwise rotation to bellcrank 376, the depending arm of which carries the pin 382 in engagement with the inclined surface 383 of an arm 384 secured on shaft 360 journalled in the framework of the machine. Therefore, counter-clockwise rocking movement of bellcrank 376 imparts a counter-clockwise rocking movement to arm 384 and shaft 360. Referring to Figs. 3, 4 and 8, shaft 360 serves to rock arm 359, in a clockwise direction as viewed in Fig. 8, to move pusher arm 355 and push rod 349 rearwardly of the machine, thereby engaging tooth 342 with tooth 343 of the zero resetting clutch (Fig. 11). Rearward movement of pusher arm 355 also positions pin 368 thereon into operative relation with cam 362 on shaft 363.

To engage the clutch and close the motor switch, shaft 360 carries an arm 385 (Figs. 3 and 4), which arm is provided with a roller 386 engaging one arm of a lever 387 rockably mounted on shaft 256. The other arm of lever 387 is formed upwardly for engagement with the pin which pivotally connects lever 78 with motor switch link 80 in a manner such that, upon counter-clockwise rocking of shaft 360 (Fig. 3), arm 385 rocks lever 387 clockwise to engage the main driving clutch and to close the motor switch substantially simultaneously with the engagement of the zero resetting clutch.

Shaft 360 also carries bellcrank 390 intermediate the ends thereof, as seen in Figs. 4 and 13, to condition conventional power-driven mechanism for the selective control of the right or left carriage shifting mechanism. Pin 391 on one arm of bellcrank 390 is engaged in slot 392 in one end of link 393, which is normally urged to the right in Fig. 13 by spring 394. Link 393 is pivotally connected to arm 395 of hook member 396 rotatably mounted on eccentric 397 secured between two similar disks 398 pinned on shaft 363. Arm 399 of hook member 396 is provided with a hook 400 for cooperation with pin 401 on one arm 402 of bellcrank 403 secured on shaft 256 in a plane adjacent the hook member 396. As explained hereinbefore, shaft 363 is cyclically driven from the main drive shaft 69 through bevel gearing 365 and 367. It is thus obvious that the hook member 396 continuously rocks on its eccentric mounting in synchronism with the main drive shaft whenever the driving clutch 68 is engaged and the motor switch is closed.

With the clockwise rocking of shaft 360 (Fig. 13) and bellcrank 390, the leading edge of the hook end of arm 399 is rocked into abutting relation with pin 401 and tensions spring 394. In the initial cycle of rotation of shaft 363, i.e., the first machine cycle, the eccentrically controlled movement of hook member 396 moves the hook 400 to a position above pin 401 for engagement therewith under the urgency of the tensioned spring 394. Upon further rotation of shaft 363 and near the end of the initial cycle of the machine operation, eccentric 397 serves to rock bellcrank 403 in a clockwise direction, whereupon pin 404 thereon is engaged by shoulder 405 of latch arm 406 under the urgency of spring 407. Following the engagement of the latch arm 406 with pin 404 the rocking of the eccentrically operated member 396 is ineffective with respect to bellcrank 403 and is thereafter disengaged therefrom. Bellcrank 403 remains in its latched position until release of the control key when spring 81 (Fig. 3) urges shaft 360 and bellcrank 390 counter-clockwise (Fig. 13). Pin 408 on bellcrank 390 is then effective to release latch 406, thereby permitting restoration of bellcrank 403 to its counter-clockwise rocked position under the urgency of spring 409.

Normally, bellcrank 403 and shaft 256, when rocked by eccentrically operated hook member 396, function to effect engagement of the left shift clutch 137 (Fig. 5) or to selectively control engagement of right shift clutch 136. To effect engagement of the clutch 137, shaft 256 carries an arm 414 (Figs. 4 and 7) on which the pusher arm 415 is pivotally connected at 416. The pusher arm 415 has its rearwardly extended end 417 notched for normal engagement with pin 183 on arm 181, the arm 181 being integral with sleeve 182 and hence with the arm 180 carrying pin 177 abutting the end of left shift push rod 178. For control of the engagement of the right shift clutch 136, shaft 256 also carries an arm 419 (Figs. 4 and 6) on which a lever 420 is pivoted at 421. A notch is provided in the rearward end 422 of right shift control lever 420 for selective engagement with pin 172 on arm 171 in accordance with the shifting movement required to move the carriage directly to the desired tabulated position thereof. The notch in the rearward end of lever 420 is normally maintained out of engagement with pin 172 under the influence of a spring 423 secured at its one end on a pin on a downwardly and forwardly extending arm 424 of lever 420, and at its other end on a pin on inverted L-shaped arm 425 secured on a shaft 426 journalled at its ends in side frame members 10 and 12.

It will be recalled that clockwise rocking of shaft 256 (Fig. 7) moves the normally engaged pusher arm 415 rearwardly to impart a counter-clockwise rotation of integral arms 180, 181 which effects a rearward movement of push rod 178 to engage the left shift clutch 137. Therefore, if a right carriage shifting operation is required to move the carriage to a preset tabulated position, shaft 426 (Figs. 6 and 7) is first rocked in a clockwise direction to remove the notched end of pusher arm 415 from its normal engagement with pin 183 on arm 181 and to effect an engagement of the notched end of lever 420 with the associated pin 172 on arm 171. In that event, the depression of dividend tabulating key 154, and consequent clockwise rocking of shaft 256, moves lever 420 and therefore push rod 167 rearwardly to effect an engagement of the right shift clutch 136.

To determine the direction of the shifting movement of the carriage 25, a series of conventional tabulator keys, or buttons, 430 is provided in the carriage, the keys being numbered "1" to "10" in accordance with the positions to which the carriage may be shifted relative to the keyboard of the machine. In the first, or leftmost, position of the carriage, as seen in Fig. 4, the rightmost revolutions counter wheel 37 and register wheels 42 and 44 are aligned with the rightmost, or units order, keys in the keyboard. In any shifted position of the carriage to the right of that shown in Fig. 4, the tabulator buttons, or keys, 430 to the left of the position occupied by the "1" key in Fig. 4 will be considered to be inboard of the machine, while those keys 430 to the right of the position occupied by the "1" key as seen in Fig. 4 will be considered to be outboard of the machine. Referring to Figs. 4, 14, 16 and 17, tabulator keys 430 are mounted for vertical endwise movement in broached slots in the front carriage frame bar 431, which keys 430 can be latched in depressed position by spring-urged latching slide 434 which is adapted to engage over the tooth 435 of a depressed key. When any one of the tabulator keys 430 is latched depressed to control one tabulating operation, the depression of another of the keys 430 to control a subsequent operation releases the latched key and latch slide 434 becomes effective to latch the subsequently depressed key in depressed position. Latching slide 434 is maintained in position in the frame bar 431 by retaining bracket 436. Each of tabulator keys 430 is urged to its normally inactive position by spring 437 upon release of latch slide 434. Regardless of the position of the carriage 25, the position of a depressed key 430 to the right or the left of the units order, or home position of the carriage, i.e., the position occupied by the "1" key 430 in Fig. 4, determines the direction of shifting movement of the carriage upon depression of the dividend tabulating key 154. If the depressed key 430 is to the left of the position of the "1" key in Fig. 4, the carriage will be shifted to the right to the desired tabulated position. Conversely, if the depressed tabulator key is to the right of the position of the "1" key the carriage will be shifted to the left to the desired position. With the carriage positioned as shown in Fig. 4, a depression and latching of the "2" tabulator key 430 inboard of the machine serves to condition mechanism for operation by a subsequent depression of the dividend tabulating key 154 to render the left shift pusher arm 415 (Fig. 7) ineffective to control a left shift operation and to rock the notch in the end of lever 420 into engagement with pin 172 on arm 171 to enable engagement of the right shift clutch 136. A lever 442 (Figs. 15, 16, and 17) is pivoted at 443 on the front surface of transverse frame member 22 for clockwise rocking movement (Fig. 15) in a plane parallel to bar 22 and has its rightmost end overlying the laterally extended upper end 444 of a right shift control slide 445 (Fig. 9) mounted for endwise movement by slots in either end thereof engaging pins 446 on side frame member 10 shown in phantom line. At its leftmost end, as viewed in Figs. 15 and 16, lever 442 is provided with an ear 447 formed inwardly to abut the face of transverse bar 22 and to overlie the upwardly extended end of a horizontally disposed arm of a lever 448 pivoted at 449 on a bracket 450 secured to, and extending substantially the length of, the rearward face of transverse member 22. The extended arm of lever 448 is provided with a reverse right angle formed therein to cross beneath bar 22 and is rockable in a plane parallel with that of bar 22 and lever 442. The other arm 452 of lever 448 extends upwardly at an angle to the horizontally extended arm of lever 448 and at its end is pivotally connected at 453 to the vertically disposed leg, or flange, of an angular member 454 adjacent the end thereof. Adjacent its other end, the vertically disposed leg of angular member 454 is pivotally connected at 455 to one end of an arm 456 which is rockably mounted at its other end on a pin 457 on bracket 450. The length of the arm 456 is equal to that of arm 452 of lever 448 and each is similarly angularly disposed to provide for parallel horizontal movement downwardly of angle 454. The horizontal leg 458 of angle bar 454 is of sufficient width and length for engagement by the lower end of any one of the "2" to "10" tabulator keys 430 upon depression thereof when the carriage 25 is in its leftmost position.

With the carriage 25 in its leftmost position, as viewed in Fig. 4, and with the "1" tabulator key 430 depressed, as seen in Fig. 14, the angle bar 454 is maintained in the inactive position shown in Figs. 14 and 17 by a spring 459 secured at its one end on a screw stud 451 and at its other end on a stud on lever 442. The movement of the angle bar 454 upwardly, under the influence of spring 459, is limited by the engagement of a laterally disposed ear 460 on the vertical leg of the bar 454 with the lower surface of the transverse frame member 22. The angle member 454 would also remain in its inactive position if the carriage 25 were positioned to the right of the position shown in Fig. 4 and if the depressed tabulator key 430 is not cooperatively positioned relative to the bar 454.

As stated hereinbefore, with the carriage positioned as shown in Fig. 4, a depression and latching of the "2" tabulator key, the second key from the left in Fig. 14, immediately imparts a downward movement to angle member 454 which, through lever 448 rocks lever 442 (clockwise in Fig. 14). The rocking of lever 442 moves slide 445 downwardly (Fig. 9) to condition mechanism for control by the dividend tabulating key 154, upon depression thereof, to disable the left shift control mechanism and to condition the right shift control mechanism in the first cycle of machine operation. Slide 445 (Figs. 9 and 18) carries a pin 465 engaged in a slot 466 extending longitudinally intermediate the ends of an arm 467 pivoted at 468 on right side frame member 10. The free end of arm 467 overlies a pin 469 (Fig. 19), aligned with pin 607 of Fig. 18, on one arm 470 of a three-arm lever 471 pivoted at 472 on an arm 473 secured on shaft 426. The upper end of the center arm 474 of three-arm lever 471 extends laterally and in the top surface thereof is provided with a V-shaped notch 475. Thus, it can be seen that upon downward movement of slide 445, arm 467 is rocked (counter-clockwise in Figs. 9 and 18) to impart a clockwise rotation to three-arm lever 471 against the urgency of a relatively light spring 476 secured at its one end on a stud on arm 474 and at its other end on a pin 477 on a projection of arm 473, thereby moving the right side of V-notch 475 into position for engagement by a pin 478 on the lower end of dividend tabulating key 154. If there is no tabulator key 430 depressed inboard of the machine, spring 476 serves to urge the forward edge of the lateral extension of arm 471 into engagement with pin 477 to maintain slide 445 and therefore angle member 454 in their inactive position. However, with the "2" tabulator key 430 depressed and latched, lever 471 will be maintained in its clockwise rocked position, the extent of rocking movement being determined by the engagement of a third arm 479 of lever 471 with pin 477 on arm 473. Upon depression of divided tabulating key 154, pin 478 contacts the right side of the V-notch 475, and through lever 471, imparts a clockwise rotation to arm 473 and therefore shaft 426, as viewed in Figs. 9 and 18.

To rock left shift pusher arm 415 counter-clockwise (Fig. 7) so that the notch in the rearward end thereof is moved out of engagement with pin 183 on arm 181, an arm 484 secured on shaft 426 carries a pin 485 in engagement with the lower end of a depending arm of a bellcrank 486 pivotally mounted on shaft 256. The other arm of bellcrank 486 underlies a pin 487 on pusher arm 415, so that, upon clockwise rocking movement of shaft 426 (Figs. 7 and 18), bellcrank 486 is rocked counter-clockwise to raise pusher arm 415 out of left shift controlling position.

Since the depression of any tabulator key 430 positioned inboard of the machine causes the carriage to be shifted to the right to the desired tabulated position, normally disengaged right shift control lever 420 (Fig. 6) must be rocked clockwise to engage the notched rearward end thereof with pin 172 on arm 171. A spring 488 is secured at its one end on a pin on arm 425 secured on shaft 426 and at its other end on a pin on an arm 489 rockably mounted on shaft 426 and normally serves to resiliently retain arm 489 in engagement with a pin 490 on arm 425. At its free end arm 489 carries a pin 491 underlying the forwardly extended end of arm 424 of lever 420 which is maintained in engagement with pin 491 by the influence of spring 423. A spring 492 secured at its one end in the framework of the machine and at its other end on a pin on arm 425, serves to maintain arm 425, shaft 426, and arm 473 in their normally inactive counter-clockwise position as determined by the engagement of the downwardly extended end of arm 489 with transverse shaft 360. It is obvious, therefore, that upon clockwise rocking movement of shaft 426 and arm 425 (Fig. 6), arm 489 is likewise rocked under the influence of spring 488 to rock the notched end of control lever 420 into engagement with pin 172 on arm 171. The disengagement of the normally engaged left shift pusher arm 415 with its pin 183 and the engagement of the normally disengaged right shift control arm 420 with its pin 172 is effected by the depression of the dividend tabulating key 154 simultaneously with the clockwise rocking of shaft 360 to engage the zero resetting mechanism (Fig. 8) and the main clutch 68 and to close the motor switch.

It will be recalled that the clockwise rocking of shaft 360 (Fig. 13) conditions the eccentrically operated hook member 396 for engagement with pin 401 in the first machine cycle, but that shortly prior thereto, at about the 180° point of the first cycle, cam 362 (Fig. 8) operates through pin 368 to disengage zero resetting pusher arm 355 from engagement with push rod 349 to enable disengagement of the zero resetting clutch 342, 343 (Fig. 11). In the latter part of the first cycle, the rotation of shaft 363 (Fig. 13) operates the hook member 396 to rock shaft 256 clockwise, thereby enabling control lever 420 (Fig. 6) to engage the right shift clutch 136 for operation in the ensuing cycle or cycles.

If the carriage 25 is positioned to the right of the position shown in Fig. 4 and any one of the outboard tabulator keys 430 is depressed, a depression of the dividend tabulating key 154 will immediately initiate a zero resetting operation in the first machine cycle and effect a left carriage shift operation in the subsequent cycle or cycles. It will be remembered that the notch in the left shift pusher arm 415 is normally engaged with pin 183 on arm 181 to control a left carriage shift operation, while the notch in the rearward end of the right shift control arm 420 is normally out of engagement with pin 172 on arm 171 and, since the depressed tabulator key 430 is outboard of the machine, slide 445 and angle member 454 remain in the inactive position shown in Figs. 9 and 14. Therefore, the depression of the dividend tabulating key 154 initiates operation of the zero resetting mechanism, engages the main drive clutch and closes the motor switch, and enables the operation of the eccentrically controlled hook member 396 in the first machine cycle to effect a left carriage shift operation in the subsequent cycle or cycles.

Referring to Fig. 4, if the "2" tabulator key 430 is depressed, the subsequent depression of the dividend tabulating key 154 (Fig. 9) effects operation of the zero resetting mechanism and operation of the right carriage shifting mechanism to move the carriage one ordinal position to the right from the position shown in Fig. 4, whereupon the depressed key 430 becomes effective to terminate the operation of the shifting mechanism, to block actuation of the revolutions counter actuator, and to adjust the plus-minus spools 46 for an additive operation, thereby enabling the entry of the dividend into the numeral wheel dials 42. Pin 478 on the lower end of dividend tabulating key 154 (Figs. 9 and 18) is engaged in an elongated slot 496 in the horizontally extended portion of a T-shaped arm 497 pivoted at 498 on right side frame member 10. A lever 499 is pivotally mounted at its forward end at 500 on the vertical arm of T-shaped member 497 and at its rearward end is provided with an elongated slot 501 engaging a roller 502 on the end of an arm of three-arm lever 503 pivoted on a shaft 513 journalled in frame members 10 and 13. The top edge of lever 499 is provided with a camming surface 504 for cooperation with a pin 505 on the lower end of a dividend entry control slide 506 mounted for endwise sliding movement on pins 446. Slide 506 is shown in its operated position in Figs. 9 and 18, but is normally urged to its raised position by a spring 507 when carriage 25 and depressed tabulator key 430 is to the right or the left of the desired tabulated position.

The rearwardly offset end of a lateral extension 508 formed at right angles to the upper end of slide 506, underlies the free end of a lever 509 pivoted at 510 for rocking movement on bracket 450 (Fig. 14). Adjacent the free end thereof, lever 509 is provided with an ear 511 projecting upwardly and formed-over at its extremity, to provide a camming shoe 512 for sliding contact with the lower end of a depressed tabulator key 430 as the carriage is moved into the desired tabulated position. As key 154 (Figs 9 and 19) is depressed to initiate a dividend tabulating operation, T-shaped member 497 is rocked counter-clockwise to move lever 499 rearwardly, positioning the top edge of the lever, to the left of the camming surface 504, beneath pin 505 on slide 506. As the "2" tabulator key 430 is moved to the first ordinal position (to the left in Fig. 14 or to the right in Fig. 4), the lower end of the depressed key 430 is moved onto the top of shoe 512 thereby camming lever 509 counter-clockwise to move slide 506 downwardly (Fig. 9) against the urgency of spring 507. Thereupon pin 505 engages the top surface of lever 499 to rock the lever clockwise, thereby imparting a counter-clockwise movement to three-arm lever 503. Counter-clockwise movement of lever 503 serves to condition mechanism which, in the last part of the shift cycle, becomes effective to terminate the shifting operation, to block the counter-actuator, and to adjust the plus-minus spools 46 to effect an entry of the dividend. Levers 499 and 503 are normally urged to the inactive position shown in Fig. 9 by a spring 516 secured at its one end to a pin on side frame member 10 and at its other end in an aperture in an arm 517 of lever 503, whereby arm 517 engages a stop pin 518 on side frame member 10. At its end, arm 517 carries a roller 519 underlying an arm 520 pivoted at 521 on the depending end of an arm 522 secured on a shaft 523 journalled in side frame members 10 and 13 and auxiliary frame member 64. A third arm 524 of three-arm lever 503 carries a pin thereon, the end of which serves to guide arm 520 against lateral displacement during its reciprocatory movement, as described hereinafter.

The timing sequence of the dividend entry phase of the operation is under the control of a cam 529 (Fig. 2) secured on the end of the driving shaft 138 for the right and left shift clutches 136 and 137 (Fig. 5). In the full-cycle position of the parts, as shown in Fig. 2 and in phantom line in Fig. 9, a roller 525 on an arm 526 of a bellcrank 527 pivoted at 528 on auxiliary frame member 64 is in engagement with the periphery of the larger arcuate portion of cam 529. A depending arm 530 of bellcrank 527 carries a pin 531 engaging in an elongated slot 532 in the upper end of an arm 533 secured on the outer end of shaft 523. Roller 525 is urged by a spring 534 to follow cam 529 during its rotation.

In the first 140° of the shift cycle, the depressed tabulator key 430 is moved onto the shoe 512 of lever 509 (Fig. 14) and spring 534 (Fig. 2) urges bellcrank 527 clockwise to engage roller 525 with the smaller arcuate surface 538 of the cam 529 thereby moving arm 520, to the right as viewed in Fig. 9. With the downward movement of slide 506 by lever 509 and the counter-clockwise rocking of lever 503, a notch 539 in the free end of arm 520 is moved into position for engagement with a pin 540 on a triangular plate member 541 pivoted at 542 on a projection of a distended arm 543 of a bellcrank 544 secured on the left end of shaft 513, shown also in Fig. 4. Pin 540 is normally held against the upper edge surface of arm 543 by a spring 545 secured at its one end on a stud on plate member 541 and at its lower end on a stud on an arm 546 of bellcrank 544. The contour of arm 546 is similar to that of the forwardly extended arm of bellcrank 503 and carries a pin 547 (Figs. 4 and 9) coaxial with pin 502 on bellcrank 503 and engaging in an elongated slot (similar to slot 501) in the rearward end of a lever 548 mounted for oscillatory movement on a pin 549 on side frame member 10. At its forward end lever 548 carries a pin 550 underlying an arm 551 of a bail 552 (Figs. 4, 9 and 18) and an adjacent arm 553 of a bail 554, both of which bails are rockably mounted on transverse shaft 426. A second arm 555 of bail 552 is pivotally connected to the lower end of a link 556 pivotally connected at its upper end at 253 on arm 254 of bail 255. The other arm 557 (Figs. 4 and 6) of bail 554 extends angularly upwardly and is provided at its end with a pin 558 which engages with the depending projection 559 of right shift control lever 420 when lever 420 is rocked clockwise to engage the notched end thereof with pin 172.

As previously explained, following the first 120° of the effective, or last shift, cycle required to move the carriage into its desired tabulated position, arm 520 (Fig. 9) is moved rearwardly to effectively position the shoulder of notch 539 therein to the right of the pin 540. In the next 20° of the cycle the lower end of the depressed tabulator key 430 is moved onto the shoe 512 to depress slide 506, thereby rocking arm 520 clockwise to position the notch 539 for engagement with pin 540. Arm 520 remains in this retracted position for the next 75°, i.e., 215° of the cycle, following which, cam 529 (Figs. 2 and 9) serves to rock bellcrank 527 counter-clockwise and shaft 523 clockwise to move arm 520 to the left, guided in its reciprocatory movement between the end of the pin on arm 524 and arm 543 of bellcrank 544. As arm 520 is moved to the left, the shoulder of the notch 539 therein engages pin 540 to impart a counter-clockwise rotation to bellcrank 544, thereby rocking lever 548 clockwise, which, through pin 550 in the forward end thereof, rocks bails 552 and 554 counter-clockwise (Figs. 9 and 18). In the example given supra, where the movement of the carriage is to the right, as viewed in Fig. 4, the counter-clockwise rocking movement of the bail 554 (Figs. 4 and 6) serves, through arm 557 and pin 558 thereon, to rock right shift control lever 420 counter-clockwise, thereby disengaging the notch in the rearward end thereof from the pin 172 to immediately effect a disengagement of the right shift clutch. Since the depression and latching of the dividend tabulating key 154 has rocked shaft 426 and therefore arm 425 clockwise (Fig. 6) to effect engagement of right shift control lever 420 with the pin 172, the counter-clockwise rocking movement of the lever 420 to terminate the right shift operation, rocks arm 489 counter-clockwise about shaft 426 against the tension of spring 488.

If a left shift operation was required to move the carriage into the desired tabulated position, the counter-clockwise rocking of bail 552 (Fig. 18) would serve through link 556 (Figs. 4, 6, 9 and 18) to impart a counter-clockwise rotation to bail 255 and bail 262 through pin 260. An ear 560 formed at a right angle to an arm 561 (Fig. 4) of bail 262 and underlying left shift pusher arm 415, engages the arm 415, rocking it counter-clockwise to disengage the notched end thereof from pin 183 to release push rod 178 to the influence of spring 179, thereby terminating the left shift operation. Following the termination of either the right shift or left shift operation, cam 529 is effective to maintain pusher arms 415 and 420 disabled for approximately 120° of the dividend entry cycle to be hereinafter described.

During the final 145° of the effective shift cycle, the movement of arm 520 to the left (Fig. 9), under the control of cam 529, also serves to prevent operation of the revolutions counter actuator 38 and to effect the adjustment of the plus-minus spools 46 for additive entry of the dividend into the numeral wheel dials 42. A link 566 (Fig. 9) is pivotally mounted forwardly on arm 543 and at its rearward end on the lower end of a lever 567 pivoted intermediate its ends at 568 on right side frame member 10. At its upper end lever 567 carries a pin 569 engaged in a bifurcation in the end of one arm of a lever 570 rockably mounted on a stud 571 on right side frame member 10. The other arm of lever 570 is pivotally connected at 572 on one end of a slide 573, which, at its other end, is guided for reciprocatory movement by the engagement thereof in a slot in transverse frame member 17. Slide 573 is provided with a projection 574 which, upon movement of the slide 573 to the left, is moved beneath the ear on actuator arm 40, thereby blocking the operation of the revolutions counter actuator 38. Thus, it can be seen that upon counter-clockwise rocking of lever 544 by arm 520 in the final phase of the effective shift cycle, link 566 serves to rock lever 567 clockwise and lever 570 counter-clockwise to move the projection 574 to a position beneath the ear on actuator arm 40 against the urgency of a spring 575. Spring 575 normally serves to maintain projection 574 in the inactive position shown in Fig. 9, as determined by the engagement of a node 576 on bellcrank 544 with stop pin 518.

It will be remembered that in the centralized inactive position of the plus-minus gate 58 and spools 46, conventional means become effective to block operation of the revolutions counter actuator 38 and become ineffective to disable the counter actuator when the plus-minus gate is moved to its additive or subtractive position, thus normally enabling a registration in the revolutions counter dials 37.

Simultaneously, with the movement of the blocking slide 573 into operative position relative to arm 40 of the revolutions counter actuator 38, means become operative upon counter-clockwise rotation of shaft 513 to move plus-minus spools 46 rearwardly to their additive position. An arm 580 is secured on the outer end of shaft 513 (Fig. 2) and carries a pin 581 engaged in an elongated open end slot 582 in an inverted L-shaped arm 583 of a lever 584 pivoted intermediate its ends at 585 on right side frame member 13. The other arm 586 of lever 584 extends angularly upwardly and carries a roller 587 normally positioned for cooperative engagement with a camming surface 588 on a depending extension of plus control arm 91. The vertical extension of L-shaped arm 583 of lever 584 carries a pin 589 engaged in a slot in one arm 590 of a bellcrank 591 operative to control a rocking movement of bellcrank 591 about its pivot 592 on side frame member 13. The end of the other arm 593 of bellcrank 591 is tapered so that in either of two positions of bellcrank 591 there is sufficient clearance between the end of the arm 593 and a roller 594 on the depending arm of latch lever 116 to enable the notch in the left end of lever 116 to engage with ear 115 in the actively rocked position of bellcrank 107.

In the first cycle of the dividend tabulation operation, i.e., the zero resetting cycle, cam 113 (Fig. 2) rocks bellcrank 107 counter-clockwise and bellcrank 102 clockwise and the notch in the end of latch lever 116 engages ear 115 on bell crank 107 to maintain roller 112 out of the path of the cam 113. When latch lever 116 becomes effective, under the influence of spring 118, to latch bellcranks 102, 107 in their actuated position, the roller 594 engages the right-hand beveled surface of arm 593. Immediately after 215° of the effective, or last shift, cycle when cam 529 effects movement of slide 520 to the left (Figs. 2 and 9), the counter-clockwise movement of lever 544, shaft 513, and therefore arm 580, rocks lever 584 and bellcrank 591 in a clockwise direction to release latch 116. During the first part of the rocking movement of arm 580, roller 587 on lever 584 is rocked clockwise into engagement with camming surface 588 as bellcrank 591 releases latch 116.

Immediately upon release of latch lever 116 following 215° rotation of cam 529 and synchronously driven cam 113, spring 114 urges bellcranks 107 and 102 counter-clockwise and clockwise, respectively, to move roller 112 into engagement with cam 113, and lever 584 rocks plus control arm 91 counter-clockwise into operative position for control by pin 100 on bellcrank 102. At the outset of the ensuing dividend entry cycle, cam 113 is effective to rock bellcrank 107 clockwise and therefore bellcrank 102 counter-clockwise (Fig. 2), whereupon they again become latched by lever 116 and, through the actively positioned arm 91, move link 93 rearwardly to rock arm 97 and shaft 60 in a clockwise direction, thereby adjusting plus-minus spools 46 for an additive entry of a keyboard value into the numeral wheel dials 42. Arm 97 is provided with an ear 600 (Fig. 20) which, in the normally centralized position of the plus-minus gate 58 and plus-minus spools 46, is juxtaposed with an ear 601 formed outwardly at a right angle to the end of latch slide 379 so that, upon clockwise movement of arm 97, slide 379 is moved to the right (Figs. 9 and 20) to release the latch from its engagement with dividend tabulating key 154, thereby releasing the key to the influence of spring 373. Even though dividend tabulating key 154 has been released to its raised position, the conventional cyclic clutch 68 remains in engagement until the end of the cycle. Plus-minus spools 46 are retained in their rearwardly adjusted position for approximately 120° of the cycle by the engagement of the latch 116 with the ear 115 on bellcrank 107.

With the release of the key 154 to its inactive raised position, lever 499 is restored to the left (Fig. 9) and spring 516 returns lever 503 to its inactive position to remove roller 519 from engagement with arm 520. However, arm 520 is frictionally held in engagement with pin 540 under the control of cam 529 and spring 575. Immediately following the initial 120° approximately of the dividend entry cycle, cam 529 enables spring 534 to urge arm 520 to the right (Figs. 2 and 9) to a position beyond the normally inactive position of the pin 540 and to enable the return of bellcrank 544 to its inactive position under the urgency of spring 575. The shoulder of notch 539 in arm 520 is therefore free to drop out of engagement with pin 540. Also with the release of key 154, spring 492 attached to arm 425 rocks shaft 426, arm 473, and lever 471 counter-clockwise (Figs. 6, 9 and 18), which, through arm 467 raises slide 445 to its inactive position if a right shift operation was required to move the carriage to its desired tabulated position. If a left shift operation was necessary for the tabulation operation, spring 492 retains shaft 426 in the counter-clockwise position shown in Fig. 6, since the pin 478 on dividend tabulating key 154 will not engage the cam surface 475 of arm 474. Upon clockwise rocking movement of bellcrank 544 by spring 575 to the inactive position shown, lever 548 is rocked counter-clockwise (Figs. 9 and 18), thereby enabling the restoration of bails 554 and 552, 255 and 262 to the normally inactive positions shown in Figs. 6 and 7 to enable the re-engagement of the notched end of left shift pusher arm 415 with pin 183 under the urgency of spring 418. Thus, it can be seen that the bails 552 and 554 were effective to maintain pusher arms 415 and 420 disabled until after key 154 had been released, thereby releasing latch 406 (Fig. 13) to permit shaft 256 to be rocked to its inactive position under the urgency of spring 409.

Referring to Figs. 2 and 9, spring 575 in restoring bellcrank 544 to its normally inactive position serves to remove projection 574 from beneath the counter actuator arm 40. Substantially simultaneously with the removal of projection 574 to its inactive position, bellcrank 544 rocks shaft 513 clockwise, and, through arm 580 (Fig. 2), imparts a counter-clockwise rotation to lever 584 to enable the restoration of plus control arm 91 to the inactive position shown under the urgency of spring 96 immediately following the release of latch 116 by bellcrank 591 and the return of the bellcranks 102, 107 to their inactive position by spring 114. Upon release of the latch 116, plus-minus gate 58 is returned to its neutral position under the control of a well-known centralizing means and a conventional blocking member associated with the gate 58 is again positioned in blocking relation to counter actuator arm 40. After 215° in the final cycle of the dividend tabulating operation, cam 529 restores arm 520 to its leftmost, or normally inoperative, position in which the notch 539 therein is to the left of, and below, pin 540.

If the carriage 25 is in the desired tabulated position, the depression of the tabulator key 430 designating that position, e.g., the "1" key as shown in Figs. 9, 14 and 18, immediately moves slide 506 downwardly so that pin 505 thereon is positioned for cooperation with cam surface 504 of lever 499 upon depression of dividend tabulating key 154. With the depression and latching of key 154, pin 478 thereon is moved downwardly to the right of the arm 474 so that shaft 426 is not rocked to enable the normally disengaged right shift control lever 420 (Fig. 6). The depression of the key 154 (Fig. 3) rocks bellcrank 376 counter-clockwise to impart a counter-clockwise rotation to arm 384 and therefore shaft 360 which is effective to rock lever 387, thereby engaging the main driving clutch and closing the motor switch. The rocking of shaft 360 (counter-clockwise in Fig. 3, or clockwise in Figs. 8 and 13) serves to rock arm 359, thereby moving zero resetting pusher arm 355 rearwardly to effect engagement of the zero resetting clutch 342, 343 (Fig. 11) in the first machine cycle. Simultaneously therewith, clockwise rocking of shaft 360 (Fig. 13) conditions eccentrically controlled hook member 396 for engagement with pin 401 on bellcrank 403, which, upon clockwise rocking thereof would normally effect an operation of the left shift clutch 137 in the second machine cycle. However, with the carriage already in the desired position, the normally engaged left shift pusher arm 415 must be disengaged from pin 183. Pin 478 on key 154 when moved downwardly, upon initiation of the operation (Figs. 9 and 18), rocks lever 497 counter-clockwise, moving lever 499 to the right so that cam surface 504 thereon engages pin 505 on depressed slide 506 to cam the right end of lever 499 downwardly, thereby rocking lever 503 counter-clockwise, which, through roller 519, raises the leftmost end of arm 520. When rocked upwardly, arm 520 engages pin 540 to impart a counter-clockwise movement to plate member 541 about its pivot 542 against the tension of spring 545. The extent of rocking movement of plate 541 is determined by the engagement of a pin 602 on plate member 541 with arm 543.

Following the initial 120° rotation of cam 529 (Figs. 2 and 9) in the zero resetting cycle, arm 520 is moved to the right and spring 545 urges pin 540 clockwise into position for cooperation with the shoulder of notch 539 in arm 520. At 215° of the zero resetting cycle, cam 529 moves arm 520 to the left, thereby rocking bellcrank 544 and shaft 513 counter-clockwise to impart a clockwise rocking movement to lever 548 which serves through bails 552, 255 and 262 to raise the notched end of pusher arm 415 out of engagement with pin 183 (Fig. 7), so that during the second machine cycle the eccentrically controlled hook member 396 rocks bellcrank 403 and therefore shaft 256 ineffectively. Simultaneously, the rocking of bellcrank 544 by the arm 520 moves the projection 574 into blocking relation with respect to revolutions counter actuator arm 40, and, through shaft 513 and arm 580 (Fig. 2), conditions the plus-minus gate control mechanism for operation at the outset of the second machine cycle to effect entry of the dividend. During the second machine cycle the operation of the dividend entry mechanism and the termination of the operation is controlled as described above.

It will be recalled that the left shift pusher arm 415 (Fig. 7) is normally positioned to engage the left shift clutch upon depression of the dividend entry key 154 when a depressed tabulator key 430 is ordinally positioned outboard of the machine. Therefore, if there is no tabulator key 430 depressed, the depression of the dividend entry key 154 will effect a shifting movement of the carriage to the leftmost position thereof wherein the left shift terminating mechanism becomes effective to cause an entry of the dividend in the register wheels 42. Referring to Figs. 9 and 18, an arm 606 is mounted for rocking movement on a pin 607 of T-shaped member 497 and is normally urged by a spring 608 into engagement with a pin 609 adjacent the forward end of arm 467. Upon depression of the dividend entry key 154, member 497 is rocked counter-clockwise thereby moving the free end of arm 606 to a position overlying a pin 610 on a lateral extension 611 on dividend entry slide 506. Since there is no tabulator key 430 depressed, each of slides 445 and 506 will be in their raised positions, so that pin 610 is in the position indicated by phantom line in Fig. 18, engaging arm 606. As the carriage is moved into its leftmost position, the left shift clutch 137 is disengaged by conventional means, which means also serves to rock arm 606 downwardly, thereby moving slide 506 downwardly to effect an entry of the dividend into register dials 42 and to release the dividend entry key 154 to terminate the operation as described hereinbefore. Upon movement of the carriage into its left-end position, lever 239 (Fig. 5) is rocked clockwise to impart clockwise rotation to three-arm lever 244 (Fig. 9) and movement of the link 250 to the left. To rock arm 606 clockwise (Figs. 9 and 18), a pin 612 on one arm of a bellcrank 613 pivoted on pin 468 overlies the free end of arm 606 in the rearwardly moved position thereof. The other arm of the bellcrank 613 is urged by a spring 614 into engagement with a pin 615 on an upwardly extended ear of link 250. As link 250 is moved to the left, bellcrank 613 is rocked counter-clockwise and through arm 606 moves slide 506 downwardly to the position shown in Fig. 18 thereby enabling operation of the dividend entry mechanism in the ensuing cycle.

If the carriage is in its leftmost position prior to the depression of the dividend entry key 154, lever 239 will have rocked bellcrank 613 counter-clockwise so that, upon depression of the key 154, an inclined surface 616 in the end of arm 606 engages pin 612, thereby camming the arm 606 clockwise to move slide 506 downwardly, effecting an immediate entry of the dividend value into the register dials 42 in the second machine cycle. On the other hand, if the carriage is in its leftmost position and a tabulator key 430 is depressed inboard of the machine, the downward movement of the slide 445 rocks arm 467 counter-clockwise and through pin 609 imparts a clockwise rotation to arm 606, moving the inclined surface 616 thereof into position for engagement with the pin 610 in the raised position of slide 506. Thus, it can be seen that upon depression of the dividend entry key 154 and the movement of arm 606 to the right, the inclined surface 616 engages pin 610, camming the end of arm 606 downwardly against the urgency of spring 608. Immediately upon movement of the carriage to the right, lever 239, link 250, and bellcrank 613 are restored to their normally inoperative position by spring 265 and as the depressed key 430 is moved into operative position with respect to slide 506, the downward movement of the slide 506 rocks the end of the already rocked arm 606 still further downwardly.

If the "1" tabulator key 430 is depressed and the carraige is in its leftmost position, the inclined surface 616 of arm 606 engages pin 612 upon depression of dividend entry key 154 to ineffectively cam the arm 606 clockwise as viewed in Fig. 18.

We claim:

1. In a calculating machine, a selection mechanism, an ordinally shiftable carriage, a register in said carriage, a resetting means for said register, means for effecting the transmission of a value from said selection mechanism into said register, a manually operable key, means for selectively shifting said carriage in either direction relative to said selection mechanism, a plurality of ordinal tabulator keys mounted in said carriage for movement therewith selectively operable to determine the position to which the carriage is to be tabulated, a sensing means operable by a selected one of said tabulator keys for terminating the operation of said shifting means and enabling the operation of said transmission means upon movement of said carriage to the predetermined ordinal position thereof, adjustable means for controlling the direction of operation of said shifting means normally biased to effect a shifting movement of said carriage in one direction for control of said sensing means by a selected one of said tabulator keys upon manipulation of said manually operable key, means for adjusting said adjustable means to control the operation of said shifting means to shift said carriage in the other direction for control of said sensing means by a selected one of said tabulator keys, means positionable by a selected one of said tabulator keys to enable the operation of said adjusting means in response to the manipulation of said manually operable key, and means operable by the manipulation of said manually operable key to initiate operation of said resetting means and to effect operation of said shifting means in accordance with the ordinal positioning of the selected one of said tabulator keys with respect to said sensing means.

2. In a calculating machine, an ordinally shiftable carriage, an ordinal register in said carriage, actuating means therefor, a power means for said actuating means, a selection mechanism, numeral keys for setting said selection mechanism, a revolutions counter, an actuator for said revolutions counter, a zero resetting means for said register and said revolutions counter, means for enabling operation of said resetting means, means for shifting said carriage including a left shift clutch and a right shift clutch, an adjustable means selectively operable to effect engagement of either of said clutches and normally biased to effect operation of said left shift clutch, an operation control key for initiating operation of said power means and enabling the operation of said resetting means, means driven by said power means for terminating operation of said resetting means, means controlled by said power means for controlling the selective engagement of said clutches in accordance with the adjustment of said adjustable means and in timed relation to the operation of said terminating means, means for adjusting said adjustable means to effect an engagement of said right shift clutch upon operation of said power controlled means, a plurality of ordinal tabulator keys mounted in said carriage selectively operable to determine the position to which the carriage is to be tabulated, a power driven means, means conditionable for operation by said power driven means to terminate the operation of said shifting means in the predetermined ordinal position of said carriage, a sensing means for control by a selected one of said tabulator keys to condition said conditionable means, means positionable by a selected one of said tabulator keys ordinally positioned to the left of said sensing means to effect operation of said adjusting means in response to the operation of said operation control key, and means controlled by said operation control key for enabling the operation of said power controlled means to effect movement of said carriage in a direction determined by the ordinal positioning of the selected tabulator key with respect to said sensing means.

3. In the apparatus of claim 2 having a latch means for said operation control key, means settable to cause the entry of a divided into said register and to effect release of said latch means, means for preventing operation of said counter actuator during the operation of said settable means, and means actuated by said conditionable means to enable the operation of said preventing means and to set said settable means upon movement of said carriage to the predetermined position thereof.

4. In a calculating machine having an ordinally arranged selection mechanism, an ordinally shiftable carriage, an ordinally arranged register in said carriage, some of the orders of said register lying inboard and others lying outboard of the selection mechanism, means for selectively shifting said carriage in either direction relative to said selection mechanism, a plurality of ordinally arranged tabulator keys in said carriage, and a tabulation mechanism including a control key for operating said shifting mechanism to shift said carriage to an ordinal position determined by an operative one of said keys, the combination which comprises an adjustable means for controlling the direction of operation of said shifting means in response to the operation of said control key normally biased to control shifting of the carriage to the left, means for sensing whether an operated one of said keys lies inboard of said selection mechanism, means operated by said sensing means for adjusting said adjustable means and thereby control shifting of the carriage to the right, and means rendered operable by the operated one of said keys being in a predetermined ordinal position with respect to said selection mechanism to terminate the operation of said shifting means.

5. In a calculating machine, a selection mechanism, an ordinally shiftable register, and means for selectively shifting said register in either direction relative to said selection mechanism, a shift control mechanism including a control key for initiating a shifting operation, adjustable means for controlling the direction of operation of said shifting means in response to the operation of said control key normally biased to effect a shifting operation of said register in one direction, a plurality of selectively settable shifting control keys ordinally arranged with respect to said register and shiftable therewith, each of said shifting control keys being representative of an order of said register to which said register may be shifted with respect to said selection mechanism and operable to effect an adjustment of said adjustable means as determined by the position of said register with respect to said selection means, and means rendered operable by each of said shifting control keys in the set position thereof to terminate the operation of said shifting means in the position of said register corresponding to the set one of said keys.

6. In a calculating machine having a selection mechanism, an ordinal register with some orders lying inboard of said selection mechanism and others lying outboard thereof, and means for ordinally shifting said register in either direction relative to said selection mechanism, a means for controlling the shifting of said register to a preselected ordinal position with respect to said selection mechanism comprising a plurality of ordinal shift control keys associated with said register for shifting movement therewith, each of said keys being selectively settable to represent the corresponding ordinal position into which the register may be shifted, a control member, means for operating said member, adjustable means normally set to control the operation of said shifting means to move said register in one direction in response to the operation of said control member, means actuated by a selected one of said shift control keys corresponding to an inboard order of said register and operable to control adjustment of said adjustable means to cause the operation of said shifting means to move said register in the other direction in response to the manipulation of said control key, and means controlled by the selectively set one of said tabulator keys to effect termination of the operation of said shifting means upon shifting of said register in either direction to the preselected ordinal position thereof.

7. In a calculating machine, a selection mechanism, an ordinally shiftable carriage, an ordinal register in said carriage having some orders lying inboard of said selection mechanism and other orders lying outboard of said selection mechanism, a control key, means for selectively shifting said carriage in either direction relative to said selection mechanism, ordinally arranged shift control keys in said carriage corresponding to certain ordinal positions of said register with respect to said selection mechanism, means for controlling the operation of said shifting means normally biased to cause shifting of said carriage to the left to move an outboard order selected by a corresponding one of said tabulator keys to a predetermined position upon operation of said control key, means adjustable by a selected one of said tabulator keys corresponding to an inboard order to effect operation of said controlling means to cause shifting of said carriage to the right to move the selected inboard order to the predetermined position in response to the operation of said control key, and means operable by a selected one of said tabulator keys upon movement of the corresponding order of the register into the said predetermined position to effect termination of the operation of said shifting means.

8. In a calculating machine having a selection mechanism, an ordinally shiftable carriage, an ordinal register in said carriage having orders lying outboard of said selection mechanism and other orders lying inboard thereof, and means for shifting said carriage in either direction relative to said selection mechanism: a tabulating mechanism comprising a control key, a plurality of ordinally arranged selectively operable tabulator control keys mounted in said carriage, each of said tabulator keys representative of an ordinal position to which said carriage is to be shifted, at least one of said keys always being inboard of said selection mechanism and the others of which may be outboard thereof, adjustable means for controlling the operation of said shifting means normally biased to effect a shifting movement of said carriage in one direction upon operation of said control key, means conditioned by an operated one of an inboard one of said tabulator keys for adjustment of said adjustable means operable to effect a shifting movement of said carriage in the other direction upon operation of said control key, means for disabling said adjustable means and thereby terminating the operation of said shifting means, and means controlled by the operated one of said tabulator keys in the selected ordinal position of said carriage to effect operation of said disabling means.

9. In a calculating machine having a selection mechanism, an ordinally shiftable carriage, means selectively operable to shift said carriage in either direction, and an ordinal register in said carriage having orders lying outboard of said selection mechanism and other orders lying inboard thereof, a tabulating mechanism for shifting carriage to a preset ordinal position comprising a control key, a plurality of ordinal tabular keys settable to represent the ordinally shifted positions of said register and when set operable to determine the order to which the register is to be shifted, adjustable means normally biased to control the operation of said shifting means to shift said carriage in one direction and adjustable to control the operation of the shifting means to shift the carriage in the other direction, means operated by manipulation of said control key for operating said adjustable means to establish a shifting operation as determined by the position of the adjustable means, a lever means mounted in the frame of the machine operated by a set one of said tabulator keys representative of an inboard order of said register to adjust the adjustable means from its normally biased position and thereby control the operation of said shifting means to shift said carriage in the other direction upon operation of said control key, and means controlled by the selectively set tabulator key to terminate the operation of said shifting means in the selected ordinal position of said carriage.

10. In a calculating machine having a selection mechanism, an ordinally shiftable carriage, means selectively operable to shift said carriage in either direction, and an ordinal register in said carriage having orders lying outboard of said selection mechanism and other orders lying inboard thereof, a tabulating mechanism for shifting said carriage to a preselected ordinal position comprising a control key, a plurality of ordinal tabulator keys settable to represent the ordinally shifted positions of said register and when set operable to determine the order to which the register is to be shifted, adjustable means normally biased to control the operation of said shifting means to shift said carriage to the left and adjustable to control operation of the shifting means to shift the carriage to the right, means operated by manipulation of said control key for operating said adjustable means to establish a shifting operation as determined by the position of the adjustable means, a lever means mounted in the frame of the machine operated by a set one of said tabulator keys representative of an inboard order of said register to adjust the adjustable means from its normally biased position and thereby control the operation of said shifting means to shift said carriage to the right upon operation of said control key, and means controlled by the selectively set tabular key to terminate the operation of said shifting means in the selected ordinal position of said carriage.

11. In a calculating machine having a keyboard, an ordinally shiftable carriage, an ordinal register in said carriage having some orders lying inboard of said keyboard and other orders lying outboard thereof, means for shifting said carriage relative to said keyboard, a right shift clutch and a left shift clutch selectively operable to control the operation of said shifting means, and a cyclically operable means for driving said shifting means upon engagement of either of said clutches, the combination which comprises means adjustable from a normal position in which it operates one of said clutches to a position in which it operates the other of said clutches, a plurality of selectively settable members each corresponding to an ordinal position of said carriage, means actuated by said cyclically operable means to adjust said adjustable means, means rendered operable by a set one of said members corresponding to an inboard order of said register to control the operation of said actuated means, means driven by said cyclically operable means in timed relation to the operation of said actuated means for rendering said adjustable means effective to engage one of said clutches in accordance with the adjustment of said adjustable means, and means controlled by a selected one of said members in set position to disable operation of said driven means upon movement of said carriage in either direction into the ordinal position corresponding to the set member.

12. In a calculating machine having a keyboard, an ordinally shiftable carriage, an ordinal register in said carriage having some orders lying inboard of said keyboard and other orders lying outboard thereof, means for shifting said carriage relative to said keyboard, a right shift clutch and a left shift clutch selectively operable to control the operation of said shifting means, and a cyclically operable means for driving said shifting means upon engagement of either of said clutches, the combination which comprises means adjustable from a normal left shift clutch operating position to a right shift clutch operating position, a plurality of selectively settable members each corresponding to an ordinal position of said carriage, means actuated by said cyclically operable means to adjust said adjustable means, means rendered operable by a set one of said members corresponding to an inboard order of said register to enable the operation of said actuated means, means driven by said cyclically operable means in timed relation to the operation of said actuated means for rendering said adjustable means effective to engage one of said clutches in accordance with the adjustment of said adjustable means, and means controlled by a selected one of said members in set position to disable operation of said driven means upon movement of said carriage in either direction into the ordinal position corresponding to the set member.

13. In a calculating machine having a keyboard, an ordinally shiftable carriage, an ordinal register in said carriage, means for shifting said carriage in either direction to a selected ordinal position thereof relative to said keyboard, means operable in the selected ordinal position of said carriage to terminate the operation of said shifting means, a cyclically operable actuating means for said shifting means, a manually operable control means for initiating operation of said actuating means, and a plurality of selectively settable members each corresponding to an ordinal position of said carriage and each effective in set position to control the operation of said terminating means upon movement of said carriage into the position corresponding thereto, the combination which comprises positionable means normally operable upon operation of said control means to control the operation of said shifting means to shift said carriage in one direction and adjustable to a position to control the operation of said shifting means to shift said carriage in the other direction, means driven by said actuating means operable to adjust said positionable means to enable operation of said shifting means to move said carriage in the other direction into an ordinal position corresponding to a set one of said members, and means rendered effective by a set one of said members to disable the operation of said driven means thereby enabling the operation of said shifting means to move said carriage in said one direction into the ordinal position corresponding to the set member.

References Cited in the file of this patent
UNITED STATES PATENTS

| | | |
|---|---|---|
| 2,216,636 | Webb | Oct. 1, 1940 |
| 2,252,621 | Eichler | Aug. 12, 1941 |
| 2,310,280 | Friden | Feb. 9, 1943 |
| 2,310,281 | Friden | Feb. 9, 1943 |
| 2,363,737 | Machado | Nov. 28, 1944 |
| 2,365,325 | Avery | Dec. 10, 1944 |
| 2,403,273 | Friden | July 2, 1946 |
| 2,714,990 | Machado | Aug. 9, 1955 |
| 2,721,698 | Gang | Oct. 25, 1955 |
| 2,733,010 | Ellerbeck | Jan. 31, 1956 |
| 2,780,411 | Kiel et al. | Feb. 5, 1957 |

FOREIGN PATENTS

| | | |
|---|---|---|
| 195,376 | Switzerland | June 16, 1938 |

OTHER REFERENCES

Ser. No. 288,057, Eichler (A.P.C.), published May 25, 1943.

UNITED STATES PATENT OFFICE
CERTIFICATE OF CORRECTION

Patent No. 2,926,845

March 1, 1960

Elwood A. Davis et al.

It is hereby certified that error appears in the printed specification of the above numbered patent requiring correction and that the said Letters Patent should read as corrected below.

Column 2, line 51, for "(Fig. 1) which, is" read -- (Fig. 1), which is --; column 11, line 52, after "cam" insert -- 334 --; column 12, line 42, for "impact" read -- impart --; column 17, line 34, for "(Figs 9 and 19)" read -- (Figs. 9 and 18) --; column 22, line 33, after "counter-clockwise" insert a comma; column 23, lines 11 and 12, for "carraige" read -- carriage --; column 24, line 14, for "divided" read -- dividend --; line 65, for "calculaing" read -- calculating --; column 25, line 69, before "carriage" insert -- said --; line 70, and column 26, line 40, for "tabular", each occurrence, read -- tabulator --.

Signed and sealed this 27th day of September 1960.

(SEAL)
Attest:

KARL H. AXLINE
Attesting Officer

ROBERT C. WATSON
Commissioner of Patents